US008224753B2

United States Patent
Atef et al.

(10) Patent No.: US 8,224,753 B2
(45) Date of Patent: Jul. 17, 2012

(54) SYSTEM AND METHOD FOR IDENTITY VERIFICATION AND MANAGEMENT

(76) Inventors: Farsheed Atef, Irvine, CA (US); Amir Dabirian, Orange, CA (US)

( * ) Notice: Subject to any disclaimer, the term of this patent is extended or adjusted under 35 U.S.C. 154(b) by 1184 days.

(21) Appl. No.: 11/295,516

(22) Filed: Dec. 7, 2005

(65) Prior Publication Data

US 2006/0161435 A1    Jul. 20, 2006

Related U.S. Application Data

(60) Provisional application No. 60/633,419, filed on Dec. 7, 2004, provisional application No. 60/697,991, filed on Jul. 12, 2005.

(51) Int. Cl.
*G06Q 20/00* (2006.01)
*G05B 19/00* (2006.01)
(52) U.S. Cl. .............................. 705/64; 705/75; 340/5.8
(58) Field of Classification Search .................. None
See application file for complete search history.

(56) References Cited

U.S. PATENT DOCUMENTS

| | | | |
|---|---|---|---|
| 38,707 A1 | 2/2003 | Geller | |
| 2002/0087460 A1* | 7/2002 | Hornung | 705/38 |
| 2003/0038707 A1* | 2/2003 | Geller | 340/5.8 |
| 2003/0061163 A1 | 3/2003 | Durfield | |
| 2003/0070101 A1* | 4/2003 | Buscemi | 713/202 |
| 2003/0126437 A1* | 7/2003 | Wheeler et al. | 713/168 |
| 2003/0126438 A1* | 7/2003 | Wheeler et al. | 713/168 |
| 2004/0005051 A1* | 1/2004 | Wheeler et al. | 380/28 |
| 2004/0254891 A1 | 12/2004 | Blinn et al. | |
| 2005/0005168 A1 | 1/2005 | Dick | |
| 2005/0021476 A1* | 1/2005 | Candella et al. | 705/64 |
| 2005/0027983 A1* | 2/2005 | Klawon | 713/168 |
| 2005/0077350 A1 | 4/2005 | Courtion et al. | |
| 2005/0078340 A1 | 4/2005 | Kato | |
| 2005/0125686 A1* | 6/2005 | Brandt | 713/200 |
| 2005/0154671 A1* | 7/2005 | Doan et al. | 705/39 |
| 2005/0165797 A1 | 7/2005 | Nair | |
| 2006/0020459 A1* | 1/2006 | Carter et al. | 704/246 |
| 2006/0282270 A1* | 12/2006 | Sheets et al. | 705/1 |
| 2008/0098222 A1* | 4/2008 | Zilberman | 713/170 |

OTHER PUBLICATIONS

International Search Report for PCT/US05/44161.
Written Opinion of the International Searching Authority for PCT/US05/44161.

* cited by examiner

*Primary Examiner* — Mussa A Shaawat
(74) *Attorney, Agent, or Firm* — Michael Stanley Tomsa; Katten Muchin Rosenman LLP

(57) ABSTRACT

A system for verifying the identity of a user includes an identification score assignment module configured to receive at least one source of identification of the user and to assign an identification score to each of the at least one source of identification. The system includes a total identification score generation module, in communication with the identification score assignment module, configured to generate a total identification score of the user from the identification scores of each of the at least one source of identification and a predetermined function. The total identification score of the user is associated with a level of verification of the identity of the user, and compared to a minimum identification score associated with a transaction. The transaction is performed when the total identification score of the user is greater than or equal to the minimum identification score.

10 Claims, 22 Drawing Sheets

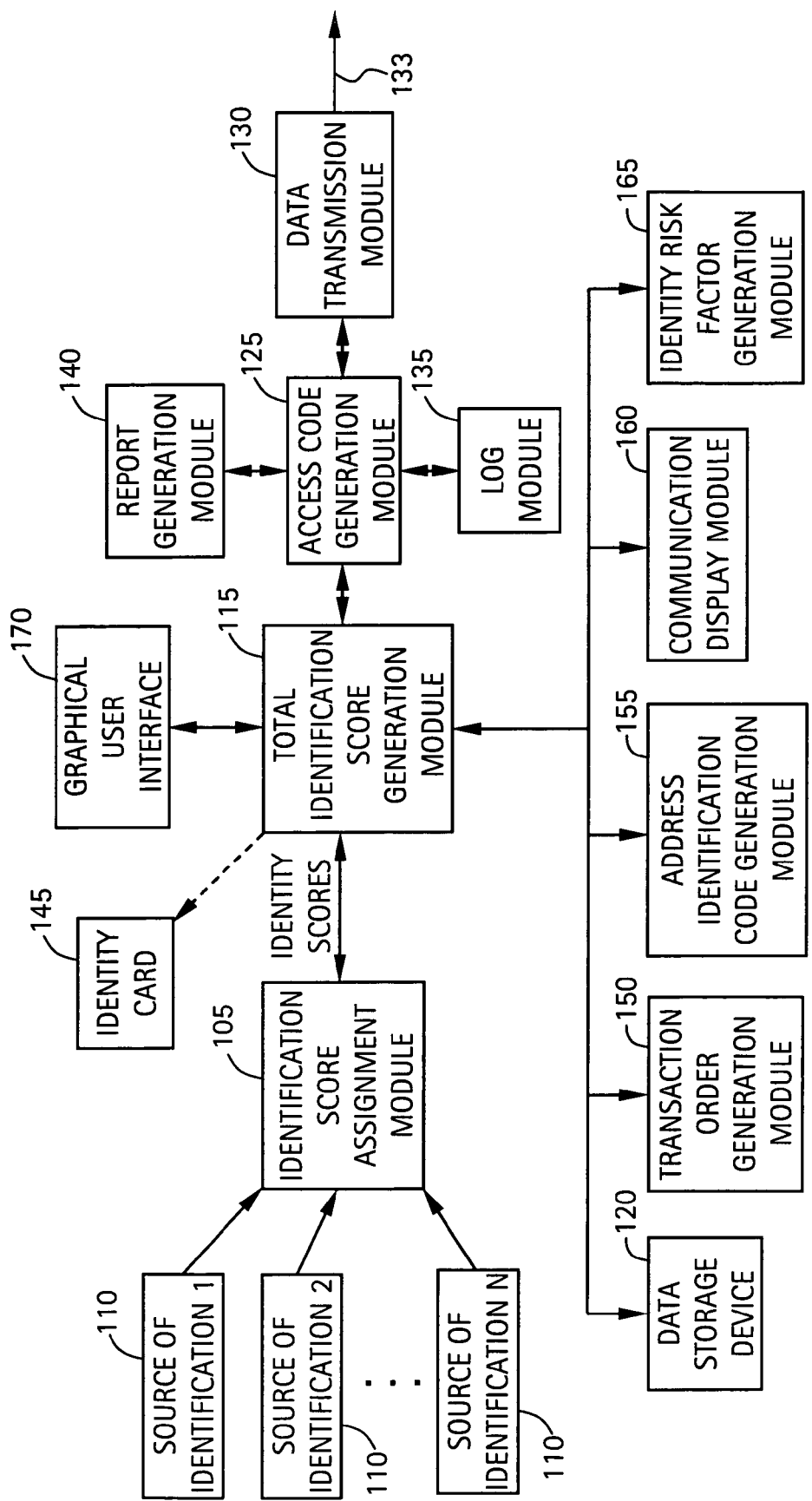

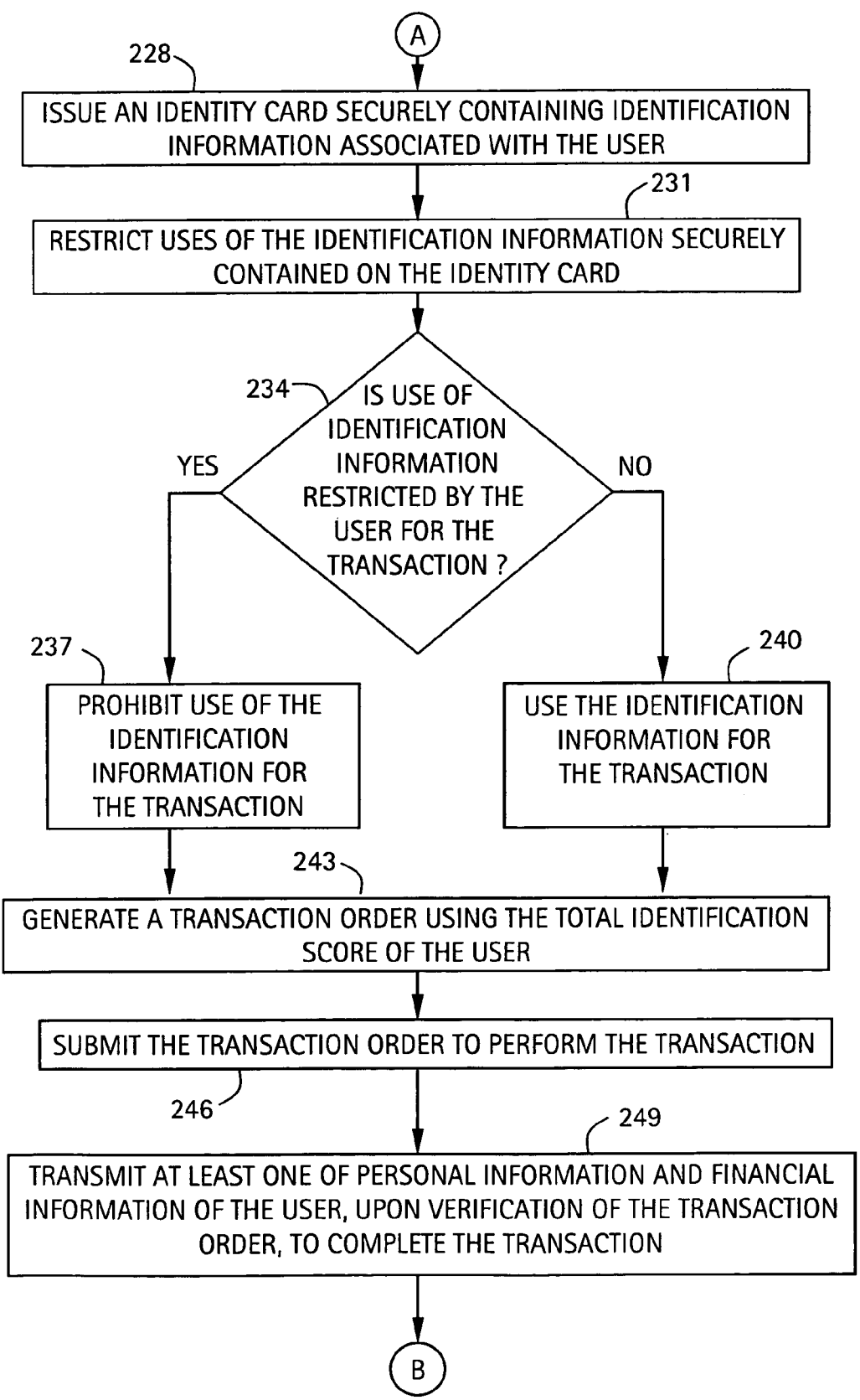

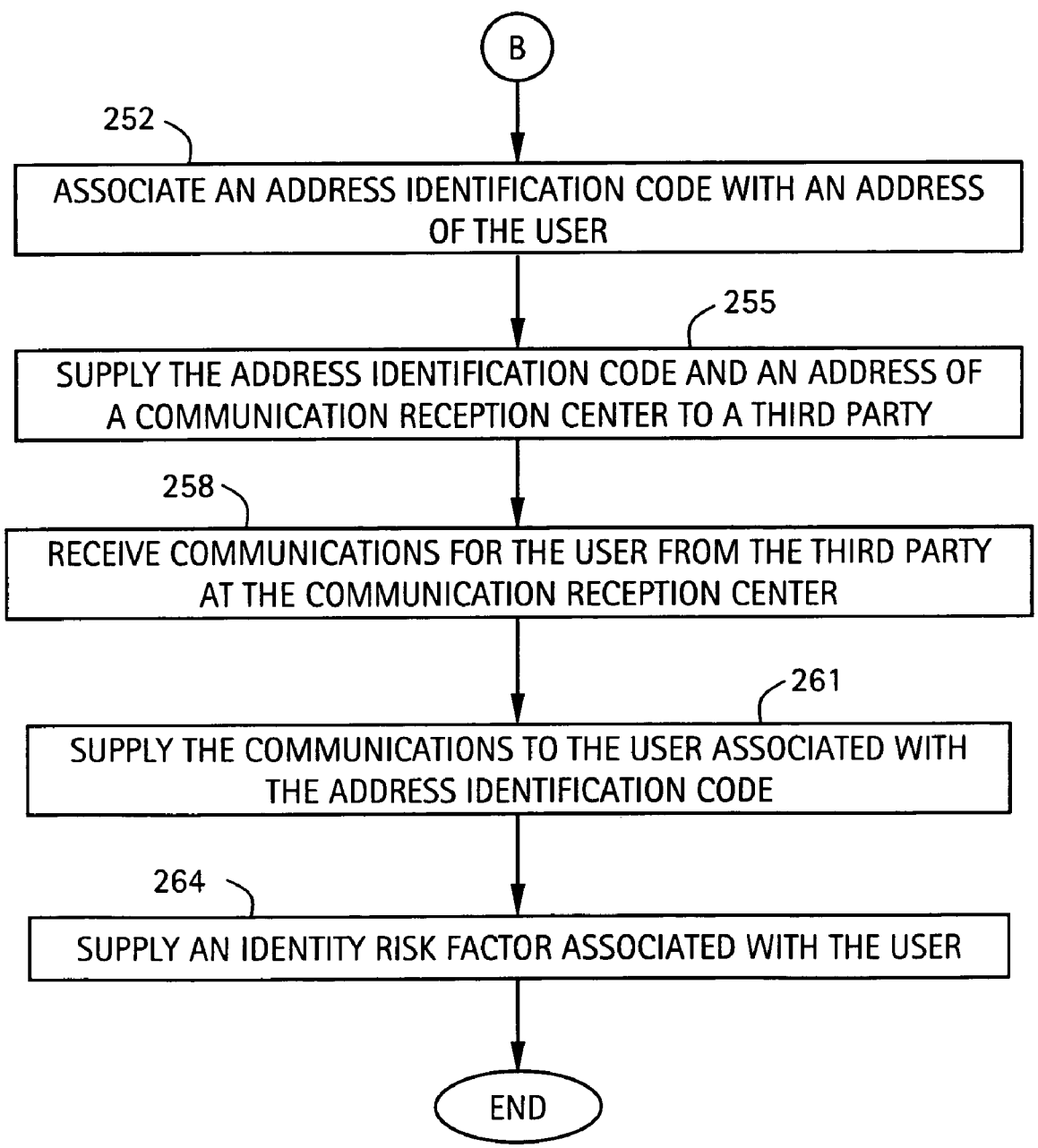

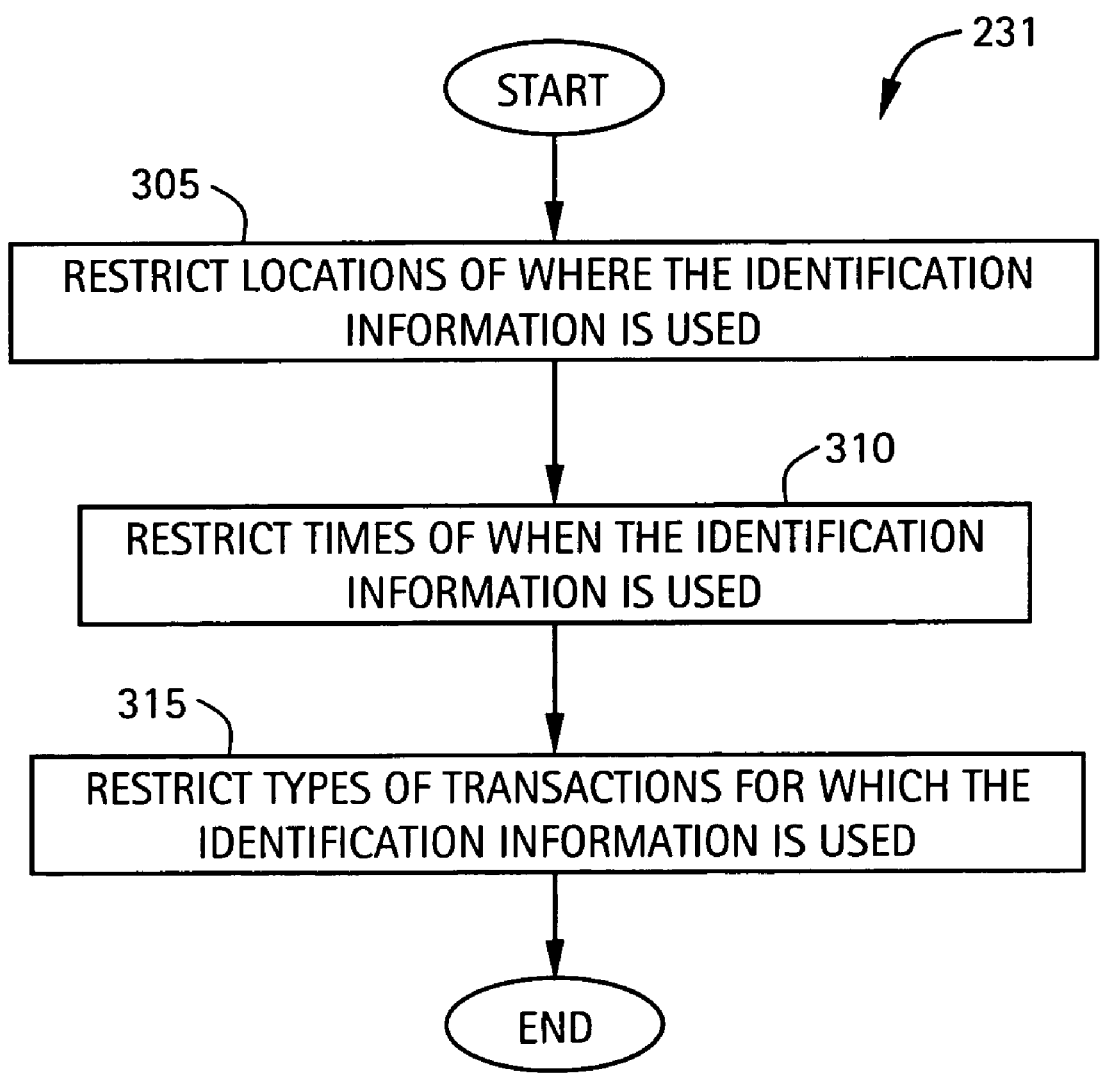

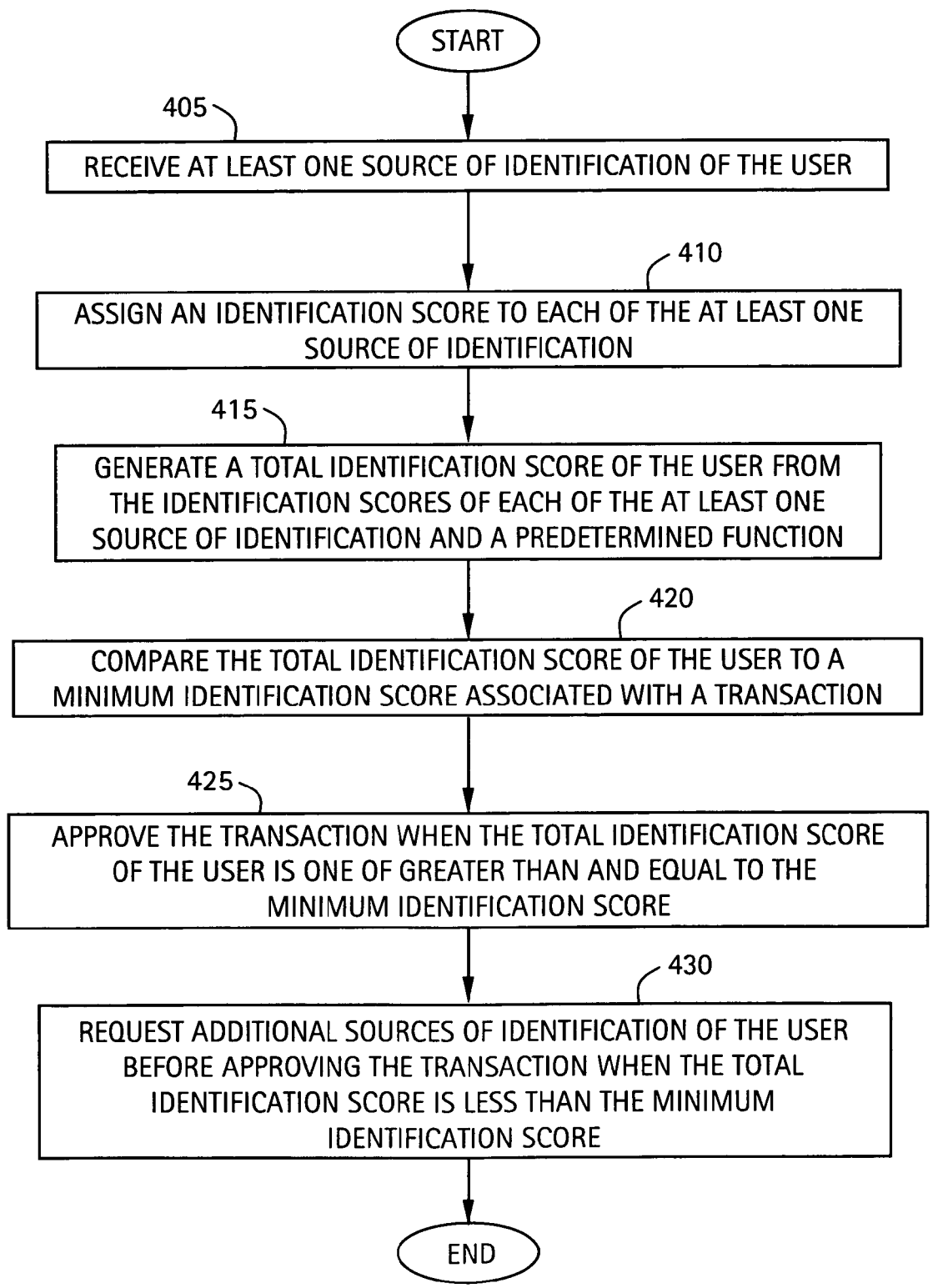

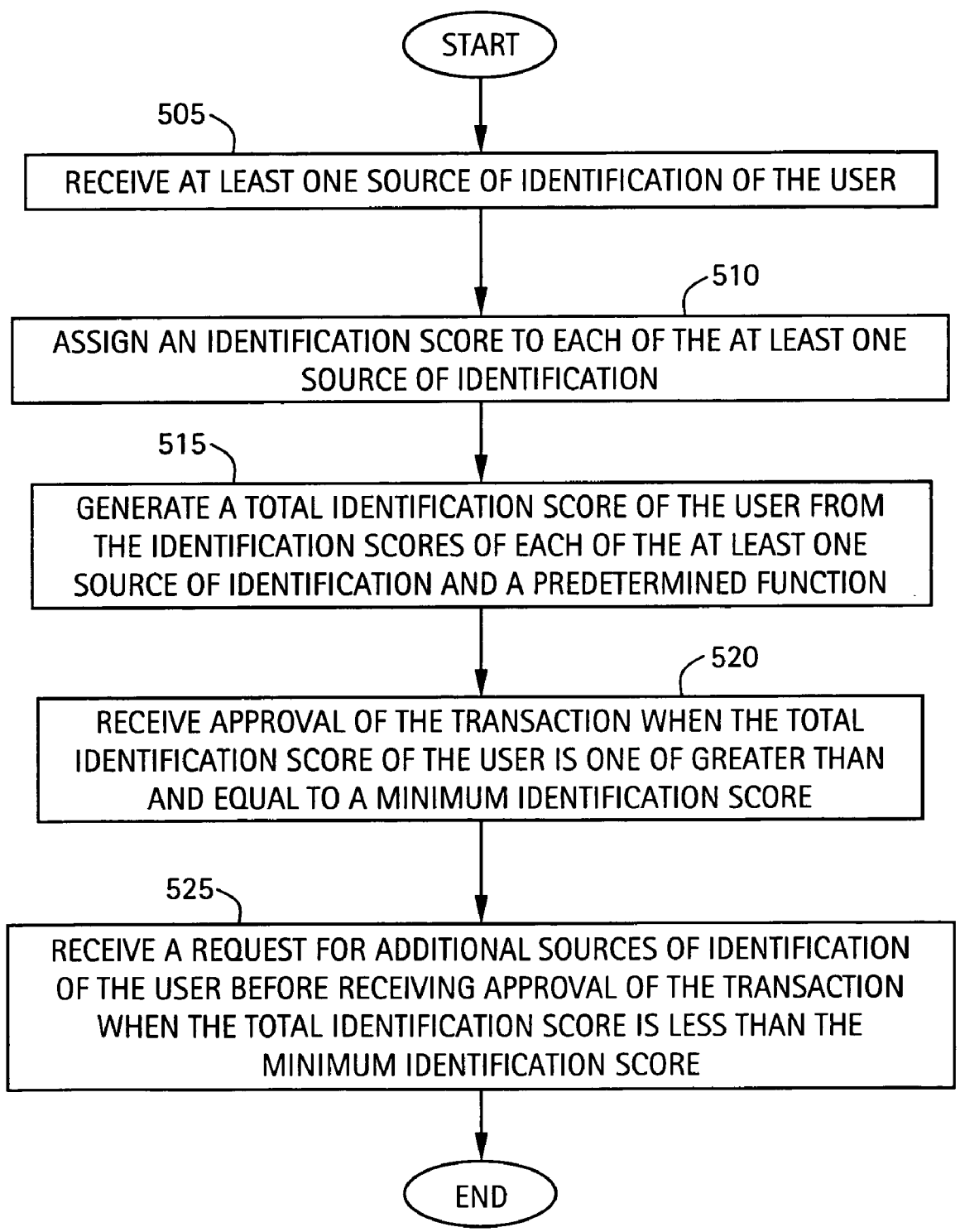

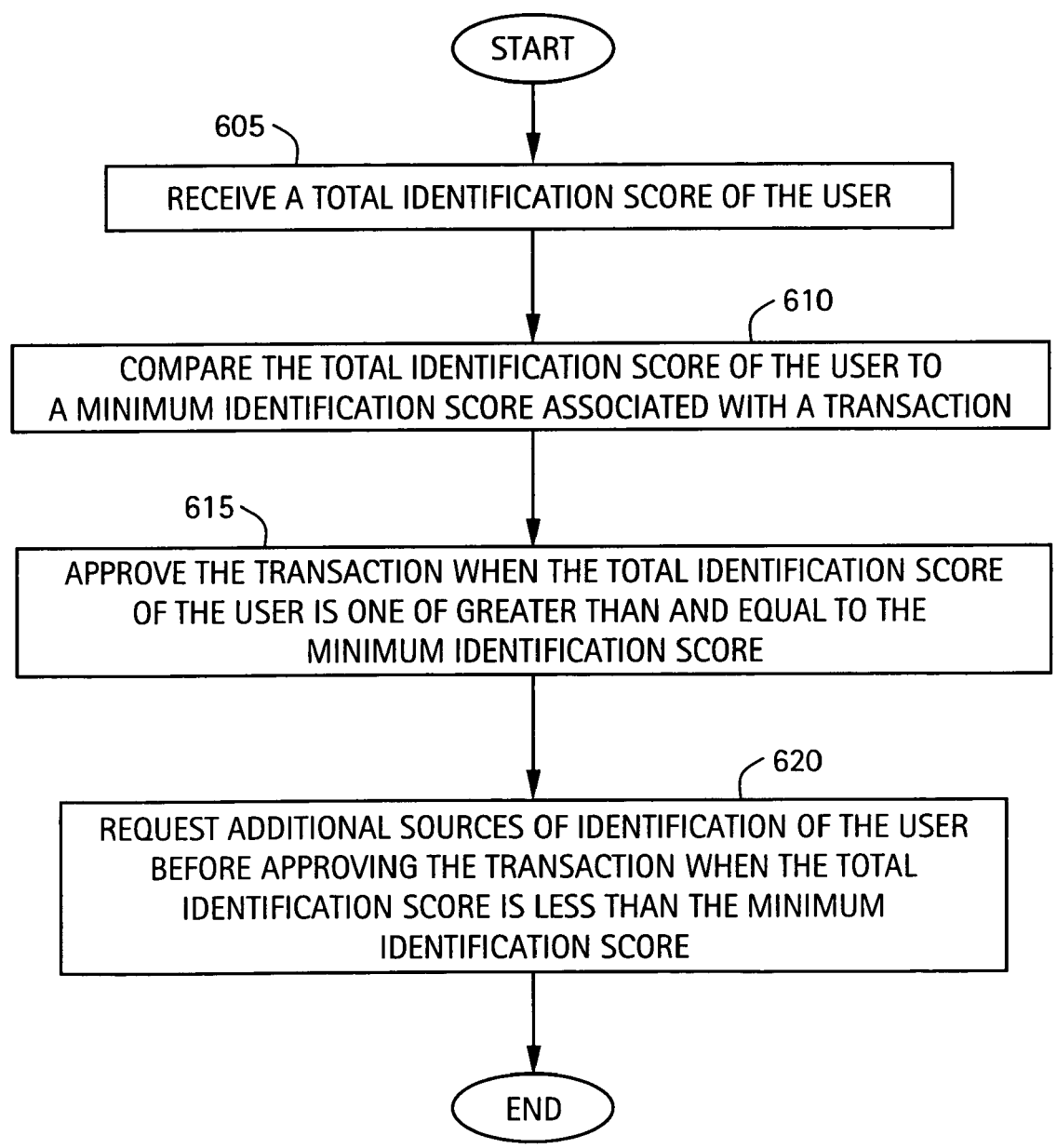

GLOBAL IDENTITY SERVICES

GID Local Institutions Identity Management
Platform Distributed Model

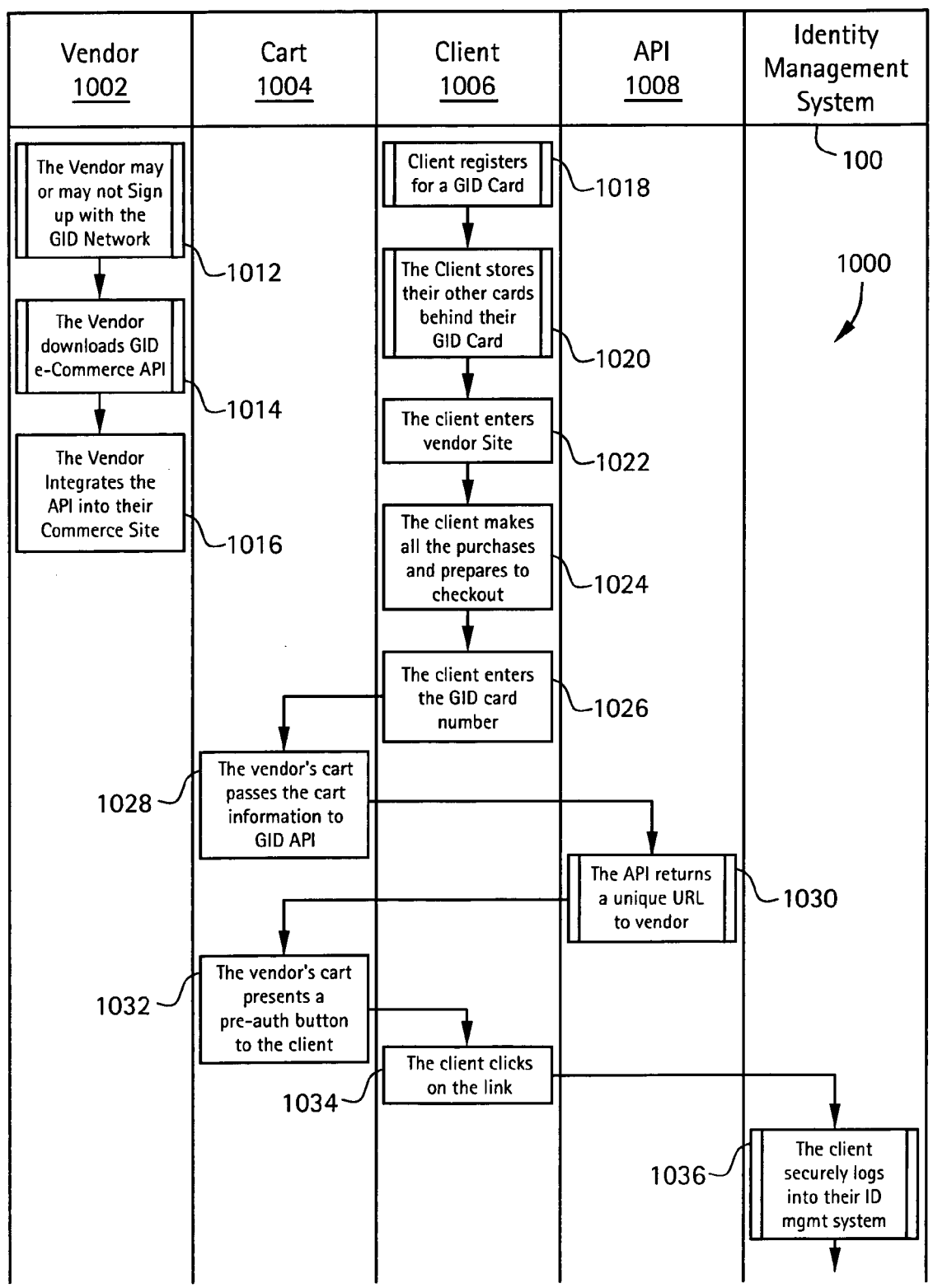

GID Pre-Auth System With One Time Card Number

GID Pre-Auth System Without GID Registration Without One Time Card Number

GID Pre-Auth System Without GID Registration With One Time Card Number

SYSTEM AND METHOD FOR IDENTITY VERIFICATION AND MANAGEMENT

This application claims priority under 35 U.S.C. §119(e) to U.S. Provisional Application No. 60/633,419, filed on Dec. 7, 2004, and to U.S. Provisional Application No. 60/697,991, filed on Jun. 12, 2005, the entire contents of each of which are hereby incorporated by reference herein.

BACKGROUND

1. Field of the Invention

The present invention relates to identity theft protection systems. More particularly, the present invention relates to a system and method for identity verification and management.

2. Background Information

Identity theft is considered one of the fastest growing crimes in the United States. For example, between 2002 and 2003, the number of reported cases of identity theft grew 80 percent. In 2002 alone, nearly ten million cases of identify theft were reported. Nearly one in 8 United States adults have fallen victim to identity theft in the last five years. On average, identify theft will cost a victim approximately $1,000 in expenses to rectify the damage caused to their financial accounts and reputations. The yearly costs of identity theft are enormous, costing business approximately $48 billion and individuals approximately $5 billion.

Identity thieves can operate in a number of ways. With the spread of the Internet and the increases in computer processing technology, access to personal and financial information of individuals (through both legal and illegal means) has become far easier and more prevalent. Other more conventional techniques include stealing credit card numbers and using those numbers to create new credit cards under false names. Job applications, personnel records and employment data that should be confidential can instead be stolen by thieves who use the information to steal workers' identities. A person's social security number can be stolen and used by the criminal to apply for credit. Once the identification is stolen and credit is issued, the identity thief can use the credit in an unrestricted manner. Typically, the victim of the identity theft may not learn of the theft until many weeks or months after the crime has occurred, for example, not until the next credit card statement is received.

Much of identity theft occurs because an individual cannot control how and who uses their identity and, consequently, their credit. The problem of identity theft also applies to companies and other like entities whose identities are also at risk, such as financial institutions, retail stores and the like. For example, a criminal company can pretend to represent a reputable company and use the reputable company's stolen identity for financial gain. For example, a fraudulent mortgage company could pretend to represent a reputable and established Bank to steal money from unsuspecting individuals, to the financial and reputational detriment of both the individuals and the Bank.

SUMMARY OF THE INVENTION

A system and method are disclosed for identity verification and management. In accordance with exemplary embodiments of the present invention, according to a first aspect of the present invention, a system for verifying an identity of a user includes an identification score assignment module. The identification score assignment module is configured to receive at least one source of identification of the user. The identification score assignment module is configured to assign an identification score to each of the at least one source of identification. The system includes a total identification score generation module in communication with the identification score assignment module. The total identification score generation module is configured to generate a total identification score of the user from the identification scores of each of the at least one source of identification and a predetermined function. The total identification score of the user is associated with a level of verification of the identity of the user. The total identification score of the user is compared to a minimum identification score associated with a transaction. The transaction is performed when the total identification score of the user is one of greater than and equal to the minimum identification score. Additional sources of identification of the user are received before performing the transaction when the total identification score is less than the minimum identification score.

According to the first aspect, the at least one source of identification can comprise a driver's license of the user. According to an alternative exemplary embodiment of the first aspect, the at least one source of identification can comprise a birth certificate of the user. The identification score assigned to each of the at least one source of identification can be based upon a reliability of the at least one source of identification. The predetermined function can comprise, for example, a summing function, a weighted summing function or the like. The system can include a data storage device. Personal information and/or financial information of the user can be stored in the data storage device. The total identification score can be associated with the personal information and/or financial information of the user. The system can include an access code generation module. The access code generation module can be configured to generate a unique identity access authorization code associated with the user for use by a third party to access information associated with the user. The system can include a data transmission module. The data transmission module can be configured to transmit at least the total identification score of the user to the third party upon verification of the identity access authorization code. The data transmission module can be configured to transmit at least the total identification score of the user to the third party upon further verification of a user identification code of the user. The user identification code can comprise a social security number of the user.

According to the first aspect, the system can include a log module. The log module can be configured to record accesses associated with the total identification score of the user by the third party. The system can include a report generation module. The report generation module can be configured to generate reports for displaying the record of accesses associated with the total identification score of the user. Personal information and/or financial information associated with the user can be transmitted to the third party upon verification of the identity access authorization code. The personal information and/or financial information associated with the user can be transmitted to the third party upon further verification of a user identification code of the user. The user identification code can comprise a social security number of the user. The system can include an identity card. The identity card can be configured to securely contain identification information associated with the user. The identity card can comprise, for example, a smart card. The identification information associated with the user can be encrypted on the identity card. Uses of the identification information securely contained on the identity card can be restricted by the user. Locations of where the identification information is used can be restricted by the user. Times of when the identification information is used can be restricted by the user. Types of transactions for which the identification information is used can be restricted by the user. Use of the identification information for the transaction can be prohibited when the identification information is restricted by the user for the transaction. The identification information for the transaction can be used when the identification information is not prohibited by the user for the transaction.

According to the first aspect, the system can include a transaction order generation module. The transaction order generation module can be configured to generate a transaction order using the total identification score of the user. The transaction order can be submitted by the user to perform the transaction. Personal information and/or financial information of the user can be accessed, using the transaction order, to complete the transaction. The system can include an address identification code generation module. The address identification code generation module can be configured to generate an address identification code associated with an address of the user. The address identification code and an address of a communication reception center can be supplied to a third party. Communications for the user from the third party can be received at the communication reception center. The communications can include the address identification code. The system can include a communication display module. The communication display module can be configured to display the communications to the user associated with the address identification code. The system can include an identity risk factor generation module. The identity risk factor generation module can be configured to generate an identity risk factor associated with the user. The identity risk factor can be associated with a level of risk of theft of the identity of the user by identity thieves. According to exemplary embodiments of the first aspect, the transaction can comprise, for example, an application for credit, a purchase transaction or the like. The system can include a graphical user interface. The graphical user interface can be configured to provide access to and management of identification information associated with the user.

According to a second aspect of the present invention, a system for verifying an identity of a user includes a receiver module configured to receive at least one source of identification of the user. The system includes an identification score assignment module configured to assign an identification score to each of the at least one source of identification. The system includes an identification score generation module configured to generate a total identification score of the user from the identification scores of each of the at least one source of identification and a predetermined function. The total identification score of the user is associated with a level of verification of the identity of the user. The system includes a comparator module configured to compare the total identification score of the user to a minimum identification score associated with a transaction. The system also includes a transaction approval module. The transaction approval module is configured to generate an approval of the transaction when the total identification score of the user is one of greater than and equal to the minimum identification score. The transaction approval module is configured to generate a request for additional sources of identification of the user before generating the approval of the transaction when the total identification score is less than the minimum identification score.

According to a third aspect of the present invention, a system for verifying an identity of a user includes an identification score assignment module configured to receive at least one source of identification of the user, and configured to assign an identification score to each of the at least one source of identification. The system includes a total identification score generation module configured to generate a total identification score of the user from the identification scores of each of the at least one source of identification and a predetermined function. The total identification score of the user is associated with a level of verification of the identity of the user. The system also includes an approval receiver module. The approval receiver module is configured to receive an approval of the transaction when the total identification score of the user is one of greater than and equal to the minimum identification score. The approval receiver module is configured to receive a request for additional sources of identification of the user before receiving the approval of the transaction when the total identification score is less than the minimum identification score.

According to a fourth aspect of the present invention, a system for verifying an identity of a user includes a receiver module configured to receive a total identification score of the user. The total identification score is generated from identification scores assigned to each of at least one source of identification of the user and a predetermined function. The total identification score of the user is associated with a level of verification of the identity of the user. The system includes a comparator module configured to compare the total identification score of the user to a minimum identification score associated with a transaction. The system includes a transaction approval module. The transaction approval module is configured to generate an approval of the transaction when the total identification score of the user is one of greater than and equal to the minimum identification score. The transaction approval module is configured to generate a request for additional sources of identification of the user before generating the approval of the transaction when the total identification score is less than the minimum identification score.

According to a fifth aspect of the present invention, a method of verifying an identity of a user includes the steps of: a.) receiving at least one source of identification of the user; b.) assigning an identification score to each of the at least one source of identification; and c.) generating a total identification score of the user from the identification scores of each of the at least one source of identification and a predetermined function. The total identification score of the user is associated with a level of verification of the identity of the user. The total identification score of the user is compared to a minimum identification score associated with a transaction. The transaction is performed when the total identification score of the user is one of greater than and equal to the minimum identification score. Additional sources of identification of the user are received before performing the transaction when the total identification score is less than the minimum identification score.

According to the fifth aspect, the at least one source of identification can comprise a driver's license of the user. According to an alternative exemplary embodiment of the fifth aspect, the at least one source of identification can comprise a birth certificate of the user. The identification score assigned to each of the at least one source of identification can be based upon a reliability of the at least one source of identification. The predetermined function can comprise, for example, a summing function, a weighted summing function or the like. The method can include the steps of: d.) supplying at least one of personal information and financial information of the user, wherein the total identification score can be associated with the at least one of personal information and financial information of the user; e.) generating a unique identity access authorization code associated with the user for use by a third party in the transaction; and f.) transmitting, to the third party, at least the total identification score of the user upon verification of the identity access authorization code. At least the total identification score of the user can be transmitted to the third party upon further verification of a user identification code of the user. The user identification code can comprise, for example, a social security number of the user.

According to the fifth aspect, the method can include the steps of: g.) recording accesses associated with the total identification score of the user by the third party; h.) reviewing the record of accesses associated with the total identification score of the user; and i.) transmitting, to the third party, personal information and/or financial information associated with the user upon verification of the identity access authorization code of the user. The personal information and/or financial information associated with the user can be transmitted to the third party upon further verification of a user identification code of the user. The user identification code can comprise, for example, a social security number of the user. The method can include the step of: j.) issuing an identity card securely containing identification information associated with the user. The identity card can comprise, for example, a smart card. The identification information associated with the user can be encrypted on the identity card.

According to the fifth aspect, the method can include the step of: k.) restricting uses of the identification information securely contained on the identity card. According to an exemplary embodiment of the fifth aspect, step (k) can comprise the steps of: l.) restricting locations of where the identification information is used; m.) restricting times of when the identification information is used; and n.) restricting types of transactions for which the identification information is used. The method can include the steps of: o.) prohibiting use of the identification information for the transaction when the identification information is restricted by the user for the transaction; p.) using the identification information for the transaction when the identification information is not prohibited by the user for the transaction; q.) generating a transaction order using the total identification score of the user; r.) submitting the transaction order to perform the transaction; s.) transmitting at least one of personal information and financial information of the user, upon verification of the transaction order, to complete the transaction; t.) associating an address identification code with an address of the user; u.) supplying the address identification code and an address of a communication reception center to a third party; v.) receiving communications for the user from the third party at the communication reception center, wherein the communications include the address identification code; w.) supplying the communications to the user associated with the address identification code; and x.) supplying an identity risk factor associated with the user, wherein the identity risk factor can be associated with a level of risk of theft of the identity of the user by identity thieves. According to exemplary embodiments of the fifth aspect, the transaction can comprise, for example, an application for credit, a purchase transaction or the like.

According to a sixth aspect of the present invention, a method of verifying an identity of a user includes the steps of: a.) receiving at least one source of identification of the user; b.) assigning an identification score to each of the at least one source of identification; c.) generating a total identification score of the user from the identification scores of each of the at least one source of identification and a predetermined function, wherein the total identification score of the user is associated with a level of verification of the identity of the user; d.) comparing the total identification score of the user to a minimum identification score associated with a transaction; e.) approving the transaction when the total identification score of the user is one of greater than and equal to the minimum identification score; and f.) requesting additional sources of identification of the user before approving the transaction when the total identification score is less than the minimum identification score.

According to a seventh aspect of the present invention, a method of verifying an identity of a user includes the steps of: a.) receiving at least one source of identification of the user; b.) assigning an identification score to each of the at least one source of identification; c.) generating a total identification score of the user from the identification scores of each of the at least one source of identification and a predetermined function, wherein the total identification score of the user is associated with a level of verification of the identity of the user; d.) receiving approval of the transaction when the total identification score of the user is one of greater than and equal to the minimum identification score; and e.) receiving a request for additional sources of identification of the user before receiving approval of the transaction when the total identification score is less than the minimum identification score.

According to an eighth aspect of the present invention, a method of verifying an identity of a user includes the steps of: a.) receiving a total identification score of the user, wherein the total identification score is generated from identification scores assigned to each of at least one source of identification of the user and a predetermined function, and wherein the total identification score of the user is associated with a level of verification of the identity of the user; b.) comparing the total identification score of the user to a minimum identification score associated with a transaction; c.) approving the transaction when the total identification score of the user is one of greater than and equal to the minimum identification score; and d.) requesting additional sources of identification of the user before approving the transaction when the total identification score is less than the minimum identification score.

According to a ninth aspect of the present invention, a system for verifying an identity of a user includes means for assigning an identity score. The identity score assigning means is configured to receive at least one source of identification of the user. The identity score assigning means is configured to assign an identification score to each of the at least one source of identification. The system includes means for generating a total identity score in communication with the identity score assigning means. The total identity score generating means is configured to generate a total identification score of the user from the identification scores of each of the at least one source of identification and a predetermined function. The total identification score of the user is associated with a level of verification of the identity of the user. The total identification score of the user is compared to a minimum identification score associated with a transaction. The transaction is performed when the total identification score of the user is one of greater than and equal to the minimum identification score. Additional sources of identification of the user are received before performing the transaction when the total identification score is less than the minimum identification score.

According to the ninth aspect, the at least one source of identification can comprise a driver's license of the user. According to an alternative exemplary embodiment of the ninth aspect, the at least one source of identification can comprise a birth certificate of the user. The identification score assigned to each of the at least one source of identification can be based upon a reliability of the at least one source of identification. The predetermined function can comprise, for example, a summing function, a weighted summing function or the like. The system can include means for storing data. Personal information and/or financial information of the user can be stored in the data storing means. The total identification score can be associated with the personal information and/or financial information of the user. The system can include means for generating an access code. The access code generating means can be configured to generate a unique identity access authorization code associated with the user for use by a third party to access information associated with the user. The system can include means for transmitting data. The data transmitting means can be configured to transmit at least the total identification score of the user to the third party upon verification of the identity access authorization code. The data transmitting means can be configured to transmit at least the total identification score of the user to the third party upon further verification of a user identification code of the user. The user identification code can comprise, for example, a social security number of the user.

According to the ninth aspect, the system can include means for logging. The logging means can be configured to record accesses associated with the total identification score of the user by the third party. The system can include means for generating a report. The report generating means can be configured to generate reports for displaying the record of accesses associated with the total identification score of the user. Personal information and/or financial information associated with the user can be transmitted to the third party upon verification of the identity access authorization code. The personal information and/or financial information associated with the user can be transmitted to the third party upon further verification of a user identification code of the user. The user identification code can comprise, for example, a social security number of the user. The system can include an identity card means. The identity card means can be configured to securely contain identification information associated with the user. The identity card can comprise, for example, a smart card means. The identification information associated with the user can be encrypted on the identity card means. Uses of the identification information securely contained on the identity card means can be restricted by the user. For example, locations of where the identification information is used can be restricted by the user. Times of when the identification information is used can be restricted by the user. Types of transactions for which the identification information is used can be restricted by the user. Use of the identification information for the transaction can be prohibited when the identification information is restricted by the user for the transaction. The identification information for the transaction can be used when the identification information is not prohibited by the user for the transaction.

According to the ninth aspect, the system can include means for generating a transaction order. The transaction order generating means can be configured to generate a transaction order using the total identification score of the user. The transaction order can be submitted by the user to perform the transaction. Personal information and/or financial information of the user can be accessed, using the transaction order, to complete the transaction. The system can include means for generating an address identification code. The address identification code generating means can be configured to generate an address identification code associated with an address of the user. The address identification code and an address of a communication reception center can be supplied to a third party. Communications for the user from the third party can be received at the communication reception center. The communications can include, for example, the address identification code. The system can include means for displaying a communication. The communication displaying means can be configured to display communications to the user associated with the address identification code. The system can include means for generating an identity risk factor. The identity risk factor generating means can be configured to generate an identity risk factor associated with the user. The identity risk factor can be associated with a level of risk of theft of the identity of the user by identity thieves. According to exemplary embodiments of the ninth aspect, the transaction can comprise an application for credit, a purchase transaction or the like. The system can also include a graphical user interface means. The graphical user interface means can be configured to provide access to and management of identification information associated with the user.

According to a tenth aspect of the present invention, a system for verifying an identity of a user includes means for receiving configured to receive at least one source of identification of the user. The system includes means for assigning an identification score configured to assign an identification score to each of the at least one source of identification. The system includes means for generating an identification score configured to generate a total identification score of the user from the identification scores of each of the at least one source of identification and a predetermined function. The total identification score of the user is associated with a level of verification of the identity of the user. The system includes means for comparing configured to compare the total identification score of the user to a minimum identification score associated with a transaction. The system includes means for approving a transaction. The transaction approving means is configured to generate an approval of the transaction when the total identification score of the user is one of greater than and equal to the minimum identification score. The transaction approving means is configured to generate a request for additional sources of identification of the user before generating the approval of the transaction when the total identification score is less than the minimum identification score.

According to an eleventh aspect of the present invention, a system for verifying an identity of a user includes means for assigning an identification score configured to receive at least one source of identification of the user and configured to assign an identification score to each of the at least one source of identification. The system includes means for generating a total identification score configured to generate a total identification score of the user from the identification scores of each of the at least one source of identification and a predetermined function. The total identification score of the user is associated with a level of verification of the identity of the user. The system includes means for receiving an approval. The approval receiving means is configured to receive an approval of the transaction when the total identification score of the user is one of greater than and equal to the minimum identification score. The approval receiving means is configured to receive a request for additional sources of identification of the user before receiving the approval of the transaction when the total identification score is less than the minimum identification score.

According to a twelfth aspect of the present invention, a system for verifying an identity of a user includes means for receiving configured to receive a total identification score of the user. The total identification score is generated from identification scores assigned to each of at least one source of identification of the user and a predetermined function. The total identification score of the user is associated with a level of verification of the identity of the user. The system includes means for comparing configured to compare the total identification score of the user to a minimum identification score associated with a transaction. The system includes means for approving a transaction. The transaction approving means is configured to generate an approval of the transaction when the total identification score of the user is one of greater than and equal to the minimum identification score. The transaction approving means is configured to generate a request for additional sources of identification of the user before generating the approval of the transaction when the total identification score is less than the minimum identification score.

According to a thirteenth aspect of the present invention, a computer-readable medium contains a computer program for verifying an identity of a user. The computer program performs the steps of: a.) receiving at least one source of identification of the user; b.) assigning an identification score to each of the at least one source of identification; and c.) generating a total identification score of the user from the identification scores of each of the at least one source of identification and a predetermined function, wherein the total identification score of the user is associated with a level of verification of the identity of the user, wherein the total identification score of the user is compared to a minimum identification score associated with a transaction, wherein the transaction is performed when the total identification score of the user is one of greater than and equal to the minimum identification score, and wherein additional sources of identification of the user are received before performing the transaction when the total identification score is less than the minimum identification score.

According to the thirteenth aspect, the at least one source of identification can comprise a driver's license of the user. According to an alternative exemplary embodiment of the thirteenth aspect, the at least one source of identification can comprise a birth certificate of the user. The identification score assigned to each of the at least one source of identification can be based upon a reliability of the at least one source of identification. The predetermined function can comprise, for example, a summing function, a weighted summing function or the like. The computer program can perform the steps of: d.) retrieving at least one of personal information and financial information of the user, wherein the total identification score is associated with the at least one of personal information and financial information of the user; e.) generating a unique identity access authorization code associated with the user for use by a third party in the transaction; and f.) initiating transmission, to the third party, of at least the total identification score of the user upon verification of the identity access authorization code. At least the total identification score of the user can be transmitted to the third party upon further verification of a user identification code of the user. The user identification code can comprise, for example, a social security number of the user.

According to the thirteenth aspect, the computer program can perform the steps of: g.) recording accesses associated with the total identification score of the user by the third party; h.) providing a review of the record of accesses associated with the total identification score of the user; and i.) initiating transmission, to the third party, of personal information and/or financial information associated with the user upon verification of the identity access authorization code of the user. The personal information and/or financial information associated with the user can be transmitted to the third party upon further verification of a user identification code of the user. The user identification code can comprise, for example, a social security number of the user. The computer program can perform the step of: j.) generating authorization for issuance of an identity card securely containing identification information associated with the user. The identity card can comprise, for example, a smart card or the like. The identification information associated with the user can be encrypted on the identity card.

According to the thirteenth aspect, the computer program can perform the step of: k.) generating use restrictions for the identification information securely contained on the identity card. According to an exemplary embodiment of the thirteenth aspect, for step (k), the computer program can perform the steps of: l.) generating location restrictions for where the identification information is used; m.) generating temporal restrictions for when the identification information is used; and n.) generating type restrictions for transactions for which the identification information is used. The computer program can perform the steps of: o.) generating use prohibitions for the identification information for the transaction when the identification information is restricted by the user for the transaction; p.) generating authorization to use the identification information for the transaction when the identification information is not prohibited by the user for the transaction; q.) generating a transaction order using the total identification score of the user; r.) forwarding the transaction order to perform the transaction; s.) initiating transmission of at least one of personal information and financial information of the user, upon verification of the transaction order, to complete the transaction; t.) associating an address identification code with an address of the user; u.) providing the address identification code and an address of a communication reception center to a third party; v.) receiving communications for the user from the third party at the communication reception center, wherein the communications can include, for example, the address identification code; w.) forwarding the communications to the user associated with the address identification code; and x.) generating an identity risk factor associated with the user, wherein the identity risk factor can be associated with a level of risk of theft of the identity of the user by identity thieves. According to exemplary embodiments of the thirteenth aspect, the transaction can comprise an application for credit, a purchase transaction or the like.

According to a fourteenth aspect of the present invention, a computer-readable medium contains a computer program for verifying an identity of a user, wherein the computer program performs the step of: a.) receiving at least one source of identification of the user; b.) assigning an identification score to each of the at least one source of identification; c.) generating a total identification score of the user from the identification scores of each of the at least one source of identification and a predetermined function, wherein the total identification score of the user is associated with a level of verification of the identity of the user; d.) comparing the total identification score of the user to a minimum identification score associated with a transaction; e.) generating an approval of the transaction when the total identification score of the user is one of greater than and equal to the minimum identification score; and f.) initiating a request for additional sources of identification of the user before generating the approval of the transaction when the total identification score is less than the minimum identification score.

According to a fifteenth aspect of the present invention, a computer-readable medium contains a computer program for verifying an identity of a user, wherein the computer program performs the step of: a.) receiving at least one source of identification of the user; b.) assigning an identification score to each of the at least one source of identification; c.) generating a total identification score of the user from the identification scores of each of the at least one source of identification and a predetermined function, wherein the total identification score of the user is associated with a level of verification of the identity of the user; d.) receiving an approval of the transaction when the total identification score of the user is one of greater than and equal to the minimum identification score; and e.) receiving a request for additional sources of identification of the user before receiving the approval of the transaction when the total identification score is less than the minimum identification score.

According to a sixteenth aspect of the present invention, a computer-readable medium contains a computer program for verifying an identity of a user, wherein the computer program performs the step of: a.) receiving a total identification score of the user, wherein the total identification score is generated from identification scores assigned to each of at least one source of identification of the user and a predetermined function, and wherein the total identification score of the user is associated with a level of verification of the identity of the user; b.) comparing the total identification score of the user to a minimum identification score associated with a transaction; c.) generating an approval of the transaction when the total identification score of the user is one of greater than and equal to the minimum identification score; and d.) initiating a request for additional sources of identification of the user before generating the approval of the transaction when the total identification score is less than the minimum identification score.

According to a seventeenth aspect of the present application, a system for verifying an identity of a user includes an identification score assignment module. The identification score assignment module is configured to receive at least one source of identification of the user. The identification score assignment module is configured to assign an identification score to each of the at least one source of identification. The system includes a total identification score generation module in communication with the identification score assignment module. The total identification score generation module is configured to generate a total identification score of the user from the identification scores of each of the at least one source of identification and a predetermined function. The total identification score of the user is associated with a level of verification of the identity of the user. The total identification score of the user is compared to a minimum identification score associated with a transaction. The system includes an identity confidence factor generation module in communication with the total identification score generation module. The identity confidence factor generation module is configured to generate an identity confidence factor associated with the user in accordance with a validity of the identity of the user. The transaction is performed when at least one of i.) the total identification score of the user is one of greater than and equal to the minimum identification score, and ii.) the identity confidence factor of the user is greater than a predetermined identity threshold value. Additional sources of identification of the user are received before performing the transaction when at least one of: i.) the total identification score is less than the minimum identification score, and ii.) the identify confidence factor of the user is less than the predetermined identity threshold value.

According to the seventeenth aspect, the validity of the identity of the user can be based on a time factor. The time factor can comprise a length of time in which the identity of the user is used legitimately. The identity confidence factor of the user can be increased as the length of time in which the identity of the user is legitimately used increases. The system can include a healthcare identity card. The healthcare identity card can be configured to securely contain identification information associated with the user. The healthcare identity card can be configured to be used by a healthcare provider to retrieve healthcare information associated with the user.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein:

FIG. 1 is a block diagram illustrating a system for verifying an identity of a user, in accordance with an exemplary embodiment of the present invention.

FIGS. 2A-2C are flowcharts illustrating steps for verifying an identity of a user, in accordance with an exemplary embodiment of the present invention.

FIG. 3 is a flowchart illustrating steps for restricting uses of identification information securely contained on an identity card, in accordance with an exemplary embodiment of the present invention.

FIG. 4 is a flowchart illustrating steps for verifying an identity of a user, in accordance with an alternative exemplary embodiment of the present invention.

FIG. 5 is a flowchart illustrating steps for verifying an identity of a user, in accordance with an alternative exemplary embodiment of the present invention.

FIG. 6 is a flowchart illustrating steps for verifying an identity of a user, in accordance with an alternative exemplary embodiment of the present invention.

FIGS. 10A and 10B are flow diagrams illustrating a transaction using an automated pre-authorization process for the identity management system without using a one-time card number, in accordance with an exemplary embodiment of the present invention.

DETAILED DESCRIPTION OF THE PREFERRED EMBODIMENTS

Figure 2A:
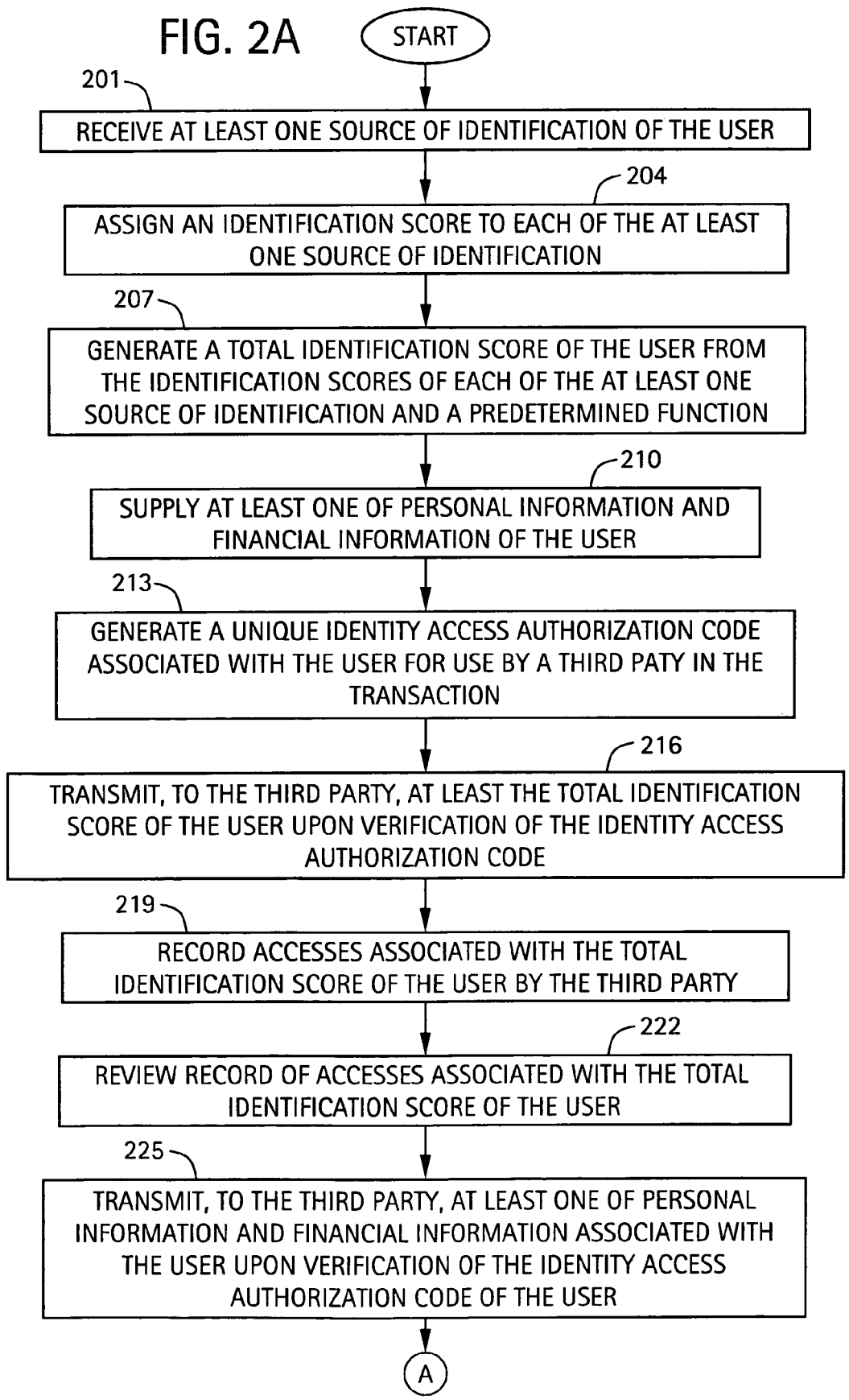

Exemplary embodiments of the present invention are directed to a system and method for identity verification and management. According to exemplary embodiments, the identity of an individual or entity (collectively, a "user") is first verified. One or more sources of identification are supplied by the user, with each source of identification being verified and given an individual identity value or score based on, for example, the level of reliability or authenticity of the identification source. The identity of the user is then evaluated based on the total of the identity scores. A total identification score is assigned to the user. Once the identity of the user is verified, the user can manage its identity using the identity management system of the present invention.

The identity management system according to exemplary embodiments can, for example, provide authorization to certain organizations to supply services to the user for a period of time. For example, each time the user authorizes an organization to provide a service to the user using the user's identity, the identity management system can provide the user with an identity authorization code to pass to the organization. Once a user sends the identity authorization code, along with its identity information, such as, for example, a social security number, the organization can further verify the identity of the user by using an additional aspect of the identity management system of the present invention. According to exemplary embodiments, the identity management system can be used by vendors wishing to provide a service to the user. For example, the identity management system can allow the vendor to input the client's identity information (e.g., social security number) along with the provided identity authorization code to determine if the user has verified the vendor to use the user's identity information based on the criteria the user has inputted into the identity management system.

The user can also restrict the use of its identity information and credit information based on, for example, an identification card issued to the user by the system. The identification card can also restrict uses of the user's identity and/or credit based on specified restrictions. For example, the user can specify a restriction such that any credit card issued to the user cannot be used internationally or the like. Such a restriction will allow the user to restrict the user's exposure to identity theft. The identity management system according to exemplary embodiments can also issue an identity risk factor to the user. The identity risk factor can assist both the user and third parties in evaluating the exposure of the user to identity theft.

Online (i.e., Internet-based) purchases can also be verified using the identity management system according to exemplary embodiments. For example, the identity management system can identify a user by asking the user to provide an identification number and/or an identity code uniquely assigned to the user. Thus, an online merchant can be certain that the credit card being used has not been stolen and is not being used in a fraudulent manner. In addition, as discussed previously, the user can restrict the use of the credit card based on specified restrictions as part of process of managing the user's identity profile.

Accordingly, by providing control and management of one's identity to the user according to exemplary embodiments, identity theft can be significantly reduced. Currently, government issued identification cards and documents, such as driver's licenses, passports and birth certificates, are among the few means of verifying a user's identity. However, these forms of identification can be obtained easily using fake or falsified information, nor are copies of these forms of governmental identification generally required when applying for credit. In contrast, exemplary embodiments of the present invention can establish, maintain and secure the identity of a user through proper identity verification and management, issuance of secure identity cards and unique identity codes to be used along with the identity cards, and the like.

As used herein, a "user" can be any person, group of individuals, company, corporation, business, retail establishment, organization or other any suitable type of entity that possesses a unique identity that can be potentially stolen or otherwise compromised, and for which protection against identity theft is desired.

These and other aspects of the present invention will now be described in greater detail. FIG. 1 is a block diagram illustrating an identity management system 100 for verifying an identity of a user, in accordance with an exemplary embodiment of the present invention. The identity management system 100 includes an identification score assignment module 105. The identification score assignment module 105 is configured to receive at least one source of identification 110 of the user. Any suitable number N of sources of identification 110 can be supplied or otherwise transmitted by the user to the identification score assignment module 105 (e.g., source of identification 1, source of identification 2, . . . , source of identification N). Each source of identification 110 can be any appropriate means for uniquely identifying a user, such as, for example, a driver's license, a social security card, a birth certificate, passport or other like credential(s) of the user. The sources of identification 110 can be supplied by the user to the identification score assignment module 105 using any appropriate means, such as any suitable form of electronic transmission (e.g., a scanned copy of the documentation, facsimile, electronic mail and/or the like) or manual delivery.

The identification score assignment module 105 is configured to assign an identification score to each of the at least one source of identification 110. According to exemplary embodiments, an identification score is a value that represents the level of verification or veracity of a given source of identification 110. In other words, the identification score assigned to each of the at least one source of identification 110 is based upon the reliability of the at least one source of identification 110. For example, identification scores can be based on a scale, such as 0 to 10, 0 to 100 or any suitable scale. For example, on a scale of 0 to 100, an identification score below a certain threshold number (e.g., 50 or other suitable value) can represent that the source of identification 110 cannot be considered trusted or reliable and is not (or cannot be) verified, while an identification score at or above the given threshold (e.g., 50 or other suitable value) can represent that the source of identification 110 can be considered trusted, reliable and verified (or verifiable). However, any appropriate identification score can be assigned to a source of information 110, so long as the identification score is indicative of the level of verification, reliability and/or veracity of the source of identification 110.

According to an exemplary embodiment, identification scores for each type of source of identification 110 can pre-assigned and stored in, for example, a look-up table or database. According to the example of a scale of 0 to 100, driver's licenses can have a score of, for example, 60 (or other suitable value), while birth certificates can have a score of, for example, 85 (or other suitable value), with each score being retrieved from the look-up table or database based on the type of source of identification 110 provided by the user. Alternatively, identification scores for each source of identification 110 can be assigned dynamically, i.e., the identification scores can be generated based on one or more factors, for example, the type of source of identification 110, personal information of the user, and the like. For example, if a driver's license is issued from a particular state, the driver's license is an original (not a copy) and the driver (i.e., the user) is above a certain age, then the identification score assigned to this source of identification 110 can be high, otherwise it can be assigned a lower score. Those of ordinary skill in the art will recognize that other methods of assigning identification scores to sources of identification 110 can be used.

The identity management system 100 includes a total identification score generation module 115 in communication with the identification score assignment module 105. The total identification score generation module 115 is configured to generate a total identification (score of the user from the identification scores of each of the at least one source of identification 110 using a predetermined function. According to exemplary embodiments, a total identification score of a user is a value that represents the level of verification of the identity of the user. The total identification score can be considered akin to, for example, a credit score that is given to a user based on the user's credit history. For example, total identification scores can be based on a scale, such as 0 to 10, 0 to 100 or any suitable scale. For example, on a scale of 0 to 100, a total identification score below a certain threshold number (e.g., 50 or other suitable value) can represent that the identity of the user cannot be considered reliable and is not (or cannot be) verified, while a total identification score at or above the given threshold (e.g., 50 or other suitable value) can represent that the identity of the user can be considered trusted, reliable and verified (or verifiable). However, any appropriate threshold can be used as the demarcation for the total identification score, so long as any total identification score at or above such a threshold is indicative of the level of verification, reliability and/or veracity of the identity of the user.

According to exemplary embodiments, the total identification score generation module 115 generates a total identification score by combining the identification scores of each source of identification 110. For example, the total identification score generation module 115 can use a summing function to sum the individual scores to create the total identification score. Alternatively, the total identification score generation module 115 can use a weighted summing function to add the individuals identification scores of each of the sources of identification 110, while giving greater weight to those sources of identification 110 that are more reliable (e.g., assigning greater weight to a birth certificate than to a social security card). Alternatively, the total identification score generation module 115 can use an averaging function to average the identification scores of the sources of identification 110. However, any suitable method for generating the total identification score from the identification scores of each of the sources of identification 110 can be used, so long as the resulting total identification score is indicative of the level of verification or reliability of the identity of the user.

For purposes of illustration and not limitation, assume that a user provides three sources of identification 110 to the identification score assignment module 105: a social security card, a driver's license, and a birth certificate. The identification score assignment module 105 can then attempt to verify each source of identification 110. For example, the identification score assignment module 105 can be configured to access public record databases (e.g., via the Internet), state department of motor vehicle databases (e.g., to verify the driver's license) or other databases of other state agencies (e.g., to verify the birth certificate), federal record databases (e.g., to verify the social security card) and the like. Assume for purposes of illustration that a scale of 0 to 100 is used for identification scores. After the verification process, the identification score assignment module 105 assigns an identification score of 54 to the social security card, an identification score of 68 to the driver's license, and an identification score of 85 to the birth certificate. As discussed previously, each of the identification scores can be either a pre-assigned number based on the type of source of identification 110, or dynamically generated based on one or more factors. These individual identification scores are then passed to the total identification score generation module 115. If the total identification score generation module 115 uses a summing function to generate the total identification score, then the summed total identification score assigned to the user would be 54+71+85=210. If an averaging function is used to generate the total identification score, the total identification score assigned to the user would be 210/3=70.

According to exemplary embodiments, the total identification score assigned to the user can be used as part of a transaction. For example, the transaction can include an application for credit, a purchase transaction, or any suitable transaction for which verification of a user's identity is required. Continuing with the present illustration, assume that the user applies for a credit card. The credit card company can receive the total identification score of the user (as discussed below) as part of the application process. The total identification score of the user can be compared to a minimum identification score associated with the transaction. Although the credit card company can perform the comparison, the total identification score generation module 115 can alternatively perform the comparison on behalf of the credit card company. For example, the total identification score generation module 115 can include or be in communication with a comparator module configured to compare the total identification score of the user to the minimum identification score associated with the transaction.

For purposes of the present illustration, assume that the credit card company requires a minimum total identification score of 50 (using an averaging function) to issue the user a credit card. Since the total identification score of the user is 70, the credit card company can be assured of the verification of the identity of the user. In other words, the transaction can be performed (e.g., the credit card is issued), since the total identification score of the user (e.g., 70) is greater than or equal to the minimum identification score (e.g., 50) required to perform the transaction. However, if the total identification score was less than the minimum identification score, one or more additional sources of identification 110 of the user can be requested, received and verified (e.g., until the total identification score is above the minimum identification score) before the transaction can be performed. For example, if the comparison is performed by the identity management system 100, the total identification score generation module 115 can include or be in communication with a transaction approval module. The transaction approval module can be configured to generate an approval of the transaction when the total identification score of the user is greater than or equal to the minimum identification score, and to generate a request to the user for additional sources of identification 110 before generating the approval of the transaction when the total identification score is less than the minimum identification score. Alternatively, if the comparison is performed by the third party, the total identification score generation module 115 can include or be in communication with an approval receiver module. The approval receiver module can be configured to receive an approval of the transaction when the total identification score of the user is greater than or equal to the minimum identification score, and to receive a request for additional sources of identification 110 of the user before receiving the approval of the transaction when the total identification score is less than the minimum identification score.

As will be apparent to those of ordinary skill, the identification scores assigned to each of the sources of identification 110, the total identification score of the user, and the minimum identification score required to perform the transaction will depend on such factors as the types of documents submitted by the user, the predetermined function used to generate the total identification score, the level of verification desired by the third party to perform the transaction, the type of transaction to be performed, and other like factors.

For example, a CONFIDENCE FACTOR™ (which can also be referred to as an "identity confidence factor") can be used to evaluate and measure the validity of a user's identity, additionally or alternatively to the total identification score of the user. For example, the CONFIDENCE FACTOR™ can be used by the total identification score generation module 115 as part of the generation of the total identification score of the user.

According to an exemplary embodiment, the CONFIDENCE FACTOR™ is a value represents the validity of a user's identity. For example, the CONFIDENCE FACTOR™ can be a base value (e.g., 0 or any suitable value) that can be increased or otherwise altered based on one or more factors, including, for example, time. For example, the CONFIDENCE FACTOR™ can be increased (e.g., by suitable increments): i.) as a user's identity is consistently and legitimately used over a period of time; ii.) based on the length of time the user has been a member of the identity verification and management system according to exemplary embodiments; iii.) based on the length of time a user preserves a healthy credit report; and/or other like temporal indications. Other appropriate factors or variables can be combined with, for example, time to determine the CONFIDENCE FACTOR™. For example, such factors can include the number of instances that a user accesses their on-line identity account, the lack of criminal records, arrests or other criminal activity, and the like. As with the total identification score, as a user's CONFIDENCE FACTOR™ increases, the probability of a false identity decreases.

According to the exemplary embodiment, the CONFIDENCE FACTOR™ can be combined with or used separately from the total identification score to indicate the level of verification or reliability of the identity of the user. The CONFIDENCE FACTOR™ can represent the validity of a user's identity proven over time and which can be based on information provided by an entity other than the user, such as criminal records later discovered and the like, while the total identification score represents a combination of identity scores that may not be dependent upon factors such as time. Thus, for example, the CONFIDENCE FACTOR™ can be added to the total identification score to improve the level of verification or reliability of the identify of the user. Alternatively, the CONFIDENCE FACTOR™ can be used as part of the evaluation of the total identification score by a third party. For purposes of illustration and not limitation, if the user has a marginal total identification score that does not qualify the user for, for example, a business loan from a financial institution, a high CONFIDENCE FACTOR™ can provide the additional identity verification required by the financial institution to authorize the loan. Additionally, if the user has a high total identification score, then a high CONFIDENCE FACTOR™ can be used by the financial institution to authorize an increased loan amount or lower interest rate for the loan.

Exemplary embodiments of the present invention can be used to perform identity access control. Accordingly, the identity management system 100 can include a data storage device 120 in communication with, for example, the total identification score assignment module 115. The data storage device 120 can be used to store personal information and/or financial information of the user, although any suitable information associated with the user can be stored in the data storage device 120. The data storage device 120 can be any suitable type of computer memory or other computer storage medium capable of storing information. According to exemplary embodiments, the total identification score of the user can be associated with the personal and/or financial information stored in the data storage device 120. By creating such an association, the information associated with the total identification score can be accessed and retrieved as part of a transaction, rather than having the user personally supply such information for each and every transaction.

Accordingly, the identity management system 100 can include an access code generation module 125 in communication with, for example, the total identification score assignment module 115. The access code generation module 125 is configured to generate a unique identity access authorization code associated with the user for use by a third party to access the personal and/or financial information associated with the user. The identity management system 100 also can include a data transmission module 130 in communication with, for example, the access code generation module 125 and, through a communication link 133, to a third party entity. The data transmission module 130 is configured to transmit at least the total identification score of the user to the third party upon verification of the identity access authorization code. The data transmission module 130 is also configured to receive information from external (i.e., third party) sources via the communication link 133.

For purposes of illustration and not limitation, assume the user has a total identification score of 70, which was generated as discussed in the previous illustration. The user then desires to apply for credit, such as a credit card. According to exemplary embodiments, the user can log into or otherwise gain access to the identity management system 100 of the present invention by, for example, logging into (e.g., via login name and password) a website or through a suitable graphical user interface (e.g., graphical user interface 170). Once the user accesses the identity management system 100, the user can have a unique identity access authorization code generated for the user by the access code generation module 125. The identity access authorization code can be given to a third party by the user to allow the third party to gain access to the user's personal and/or financial information maintained by the identity management system 100. The identity access authorization code can be any suitable code or number that is unique to the user, such as, for example, a random number, an alphanumeric string of characters, the public key of a public key-private key public key infrastructure (PKI) system, or the like. According to an exemplary embodiment, the identity access authorization code can be a one-time use code, although the identity access authorization code can be used any number of times.

Continuing with the present illustration, when applying for the credit card, instead of inputting its personal and financial information into the application form, the user can supply the identity access authorization code to the bank or other financial institution to whom the user is applying for credit. Using the user's identity access authorization code and, for example, an identifier that uniquely identifies the financial institution (e.g., a financial institution identification number), the financial institution can gain access to the identity management system 100 to retrieve information associated with the user (e.g., through the graphical user interface 170 or like interface). In other words, the personal information and/or financial information associated with the user can be transmitted to the third party (e.g., via data transmission module 130) upon verification of the identity access authorization code. For example, the financial institution can retrieve the total identification score of the user, as well as any personal and/or financial information associated with the user that is needed for the credit application. The retrieved information can then be used by the financial institution to complete or otherwise fill in, for example, the credit card application on behalf of the user. As discussed previously, the financial institution can compare the total identification score of the user to a minimum identification score to determine whether the application process can continue (e.g., when the total identification score is greater than or equal to the minimum identification score) or whether additional sources of identification 110 are required from the user before continuing (e.g., when the total identification score is less than the minimum identification score).

According to an exemplary embodiment, to improve the security of the user's personal and/or financial information stored in the identity management system 100, a user identification code can be generated by the identity management system 100 (e.g., by the access code generation module 125) or supplied by the user to the third party entity, along with the identity access authorization code. The third party entity can use the user identification code in connection with the identity access authorization code before access and retrieval of the user's information is granted to the third party entity. For example, the data transmission module 130 can be configured to transmit at least the total identification score of the user to the third party upon further verification of the user identification code of the user. The user identification code can be any suitable number or code that uniquely identifies the user, such as the user's social security number or the like.

The identity management system 100 can include a log module 135 in communication with, for example, the access code generation module 125. The log module 135 can be configured to record or otherwise store a list of, for example, accesses associated with the total identification score of the user by the third party. However, the log module 135 can be configured to record accesses to any of the personal and/or financial information associated with the user that is stored and maintained by the identity management system 100. The identity management system 100 can also include a report generation module 140 in communication with, for example, the access code generation module 125. The report generation module 140 can be configured to generate, for example, reports for displaying the record of accesses associated with the total identification score and other information associated with the user. The record of accesses can be displayed to the user through, for example, a graphical user interface (e.g., graphical user interface 170) or other display device or printed in hard copy for review by the user. Additionally, the log module 135 can be used to maintain a record of each use of a user's identification information by a third party. The report generation module 140 can then provide an identity report to the user by which the user can view the activities performed by the third parties with respect to the user's identity, in a manner similar to that which a user reviews a credit report to view credit transactions and credit activity.

According to exemplary embodiments, an identity card 145 can be issued by the identity management system 100 at the request of the user (e.g., by logging into the identity management system 100 through the graphical user interface 170 and making such a request). The identity card 145 can be configured to securely contain identification information associated with the user. For example, the total identification score of the user can be encrypted (e.g., using any suitable encryption technique) and stored on the identity card 145, although any suitable information can be securely contained on the identity card 145, such as, for example, the personal and/or financial information associated with the user. However, according to an alternative exemplary embodiment, the identity card 145 can act as a key to access information stored remotely.

The identity card 145 can comprise a smart card (e.g., containing a "smart chip"), a card with a magnetic stripe, or any suitable storage medium on which encrypted information can be stored. Alternatively, the identify card 145 can comprise any suitable form of electronic device capable of storing information, such as, for example, a cell phone or other electrical or electronic devices. In addition, the identity card 145 can include biometric forms of identification, such as, for example, a fingerprint or the like. Alternatively, the identify card 145 can comprise a unique identifying feature of a human, such as an individual's sclera, retina or fingerprint that can be used with or without an accompanying card or other identifying device. According to an alternative exemplary embodiment, suitable RFID technology can be used. The RFID technology can be used instead of the card (e.g., a suitable RFID chip can be implanted within or on a person or a person's belongings) for use with the identity management system 100. Alternatively, a suitable RFID chip or device can reside on the identity card 145.

The user can then provide the identity card 145 to a third party, who can decrypt the identification information stored on the card and use that information as part of a transaction (e.g., applying for credit, a purchase transaction, and the like). For example, the identification information contained on the identity card 145 can be used by the third party in addition or alternatively to the information that can be retrieved by the third party using the identity access authorization code. Alternatively, the identification information contained on the identity card 145 can comprise, for example, the identity access authorization code by which the third party gains access to the information associated with user that is stored and maintained by the identity management system 100.

According to exemplary embodiments, the user can restrict the uses of the identification information securely contained on the identity card 145. For example, the user can restrict the locations of where the identification information is used (e.g., the identification information can only be used in the United States and Canada, but not in Mexico). Additionally or alternatively, the user can restrict the times of when the identification information is used (e.g., the identification information can only be used between the hours of 9:00 a.m. and 5:00 p.m.). Additionally or alternatively, the user can restrict the types of transactions for which the identification information can be used (e.g., the identification information can only be used for purchase transactions, but not applications for credit). Other types of restrictions of the identification information securely stored on the identity card 145 are possible. According to exemplary embodiments, the third party can decrypt the identification information stored on the identity card 145. Using the decrypted identification information, the third party can access the identity management system 100 (e.g., through the graphical user interface 170 using the identity access authorization code, through a secure socket connection using an appropriate network protocol and the like) as part of a transaction. Based on the restrictions placed on the identification information by the user, the identity management system 100 can prohibit or otherwise deny the use of the identification information when the identification information is restricted by the user for the transaction, or allow or otherwise approve the use of the identification information when the identification information is not prohibited by the user. Thus, the use of the identification information securely contained on the identity card 145 can be approved or denied in a manner similar to that which a bank either approves or denies the use of a credit card for a purchase transaction.

According to an alternative exemplary embodiment of the present invention, the identity card 145 can also be used to restrict the uses of accompanying credit cards, checks, affiliated identification cards (as discussed below) and the like forms of payment or identification that can be used in conjunction with the identity card 145. For example, the user can restrict the use of credit cards by specifying where, when and how the credit cards can be used. For example, based on the identification information securely contained on the identity card 145, a merchant or other third party can either allow the accompanying credit card to be used when the use falls within the restriction(s) specified in the identification information, or deny the use of the credit card when the use does not. As discussed previously, the restriction information can be included in the identification information securely contained on the identity card 145, which is provided to the third party once the identification information is decrypted. For example, when the user provides the identity card 145, the identity management system 100 can automatically inform the third party of the restrictions by allowing or rejecting the use of the identity card 145.

Alternatively, the identification information can be used by the third party to gain access to the identity management system 100, at which time the user-specified restriction(s) for the credit card are provided to the third party. According to an alternative exemplary embodiment, the third party can access the user-specified restrictions directly from the identity management system 100 using, for example, a unique third party authorization code (e.g., generated by the identity management system 100), regardless of the presence of the identity card 145. For example, a third party can independently access the identity management system 100 remotely (e.g., through the Internet, graphical user interface 170, telephone or automated customer service, through an appropriate secure network connection, or the like) to check for the user's total identification score, other identification information, and for any user-specified restrictions placed on the form of payment (e.g., a credit card, check or the like) proffered by the user, when the user does not provide the third party with an identity card 145. To access the user's identity information and any accompanying restrictions, the third party can log into the identity management system 100 (e.g., through the graphical user interface 170, telephone support, secure network connection or the like), enter the third party's unique vendor authorization code, and enter the account number of the form of payment proffered by the user (e.g., credit card number, checking account number, and the like). The identity information and any user-specified restrictions can then be provided to the third party by the identity management system 100.

According to an exemplary embodiment, the identity theft protection provided by the use of an identity card 145 can be separate from credit protection that can be associated with one or more credit cards. Thus, a separate identity card 145 and credit card(s) can be used. Although the identity card 145 can be used in conjunction with any suitable form of payment or identification, the identity card 145 can also serve as both a form of payment (e.g., a credit card or the like) and means of identification simultaneously, without the need for separate forms of payment and identification. Thus, the identity card 145 can serve as the only form of payment and identification that the user need carry. For example, credit card information or other payment information can be entered into the identity management system 100 and be accessible by the identity card 145, along with the identification information of the user (including, for example, any user-specified restrictions associated with the forms of payment). To access a particular credit card or other form of payment, the user can enter a personalized PIN number or suitable pass code into a third party's point-of-sale (POS) system that will allow the use of the information associated with the particular credit card or other form of payment for the transaction. Each form of payment can be associated with a unique pass code, or a single pass code can be associated with all forms of payment, allowing the user to associate a particular form of payment with the pass code as desired.

For example, the user can log into the identity management system 100 (e.g., using the user's unique name and password) and enter information associated with one or more forms of payment, such as, for example, credit card numbers, expiration dates and authorization codes, although information associated with any suitable form of payment (e.g., check cards, checks and the like) can be entered. For purposes of illustration and not limitation, the user can enter information associated with a credit card, such as the following:

Name on Credit Card: John Q. Smith
Credit Card Type: Visa
Credit Card Number: 1234-1234-1234-1234
Expiration Date: 07/2010
CVV Code: 4567

Once this information is entered, the identity management system 100 can generate a unique code that can be assigned to the credit card (such as, for example, Card Pass Code: 98765) and associated with the identity card 145 of the user. Any unique code or number can be assigned to the form of payment. The user can then use the identity card 145 to conduct a financial transaction, without the need to proffer a separate form of payment. For purposes of the present example, when making a purchase or performing a financial transaction, to use the aforementioned Visa credit card, the user can swipe or otherwise enter the identity card 145 into the merchant's POS system and enter the pass code of 98765, thereby retrieving the credit card information associated with the identity card 145 and the pass code.

As discussed previously, according to one exemplary embodiment, a single identity card 145 can be used to access any or all identification or credit card information. In other words, a user can carry the identity card 145 instead of many other cards. As noted previously, users can store or otherwise associate any credit card information with the identity card 145 using the identity management system 100. For example, the user can access the identity management system 100 via, for example, the Internet or World Wide Web via a suitable graphical user interface (e.g., graphical user interface 170) and an appropriate Internet or network connection. However, to charge a credit card stored on or otherwise associated with the identity card 145, the merchant or third party can process the charge through conventional credit card network. The credit card network is a specialized network that is connected to merchants, credit card companies and banks.

Conventionally, to perform a credit card transaction, the user or the merchant swipes a credit card through a credit card reading device. The device reads the information from the card and sends it to a first processing site (a "first processor" or "acquirer") for processing by the merchant. From the first processor, the information will be transmitted via the credit card network and ultimately reach a second processing site (a "second processor") at a designated bank or financial institution for processing (e.g., authorization or denial of the charge). The bank or other financial institution that receives the charge information is the bank or financial institution that issued the credit card to the user. An authorization or denial of the charge, based on the user's available credit, will be sent to the merchant or third party via the second and first processors.

According to an exemplary embodiment, the identity management system 100 can review the authorization transactions processed by the merchants or third parties as part of identity theft prevention. To review such authorization transactions, the existing merchant authorization process can be modified by placing a third processing site (a "third processor") between the first and second processors. Thus, according to exemplary embodiments, when the merchant or user swipes the identity card 145 through the credit card reading device, the information from the identity card 145 will be sent to the first processor. From the first processor, the information can be transmitted through the credit card network to the third processor. The third processor can reside in, for example, the identity management system 100. For example, the third processor can compare the identity information associated with the credit card information to verify the identity of the user to ensure that an actual or potential identity theft is not occurring (e.g., the credit card has not been marked as lost or stolen and the like, as discussed below). For example, if the identity of the user making the credit card charge is not the correct identity associated with the credit card authorization, the third processor can issue an identity denial of the credit card transaction based on the failed identity verification. Otherwise, the third processor can issue an identity authorization for the credit card transaction as a result of the verified identity. After the information has been verified by the third processor, the charge information can be sent to the second processor at the bank for financial authorization or denial of the transaction, for example, based on the user's available credit.

More particularly, the first processor receives a request for credit card authorization from the point-of-sale (POS) and passes that request to the issuing bank for verification. The first processor then relays the answer to that request from the issuing bank to the merchant. When a merchant wants to establish a connection with a network, the merchant establishes the connection through a gateway. The first processor receives the merchant request for credit card authorization and sends it to the network. From the network, the request finds its way to the issuing bank's database for authorization. Some banks act as their own processor and receive and answer any requests. However, many banks register with a second processor, such as Élan Financial Services or the like. The second processor has access to the issuing bank's information and can issue authorization. Once the second processor accesses the bank data, it can relay an answer back through the network to the first processor and ultimately to the merchant. Most or all accounts can settle through a clearing house and get deposited into the merchant's acquiring bank for final reconciliation of authorizations.

The third processor can act like the second processor, and, in a manner, replace the second processor. For example, the identity management system 100 can issue a global or universal credit card (such as the identity card 145 or a separate credit card), as discussed below. The global credit card can be used in several different ways. For example, the global credit card can be used to store other credit cards. When a user uses the global credit card along with a PIN associated with a certain stored credit card, an authorization request can be sent from the merchant through a gateway to the merchant's chosen processor. From the first processor the request can be sent to the network and finally to the identity management system 100. The identity management system 100 can make a connection to the issuing bank and check the user's account for availability of funds. The transaction can be performed using an "On-Us" approach to avoid network charges, as discussed below. If funds are available, an authorization message can be sent to the merchant. If funds are not available, a authorization declined messages can be sent instead. If an authorization is provided to the merchant, a settlement can be requested to transfer the funds to, for example, the identity management system 100 as soon as possible. In such a transactional system, the user would have zero credit balance in the identity management system 100. All balances would be provided by the issuing bank. The identity management system 100 would then be used for management of the transaction.

Alternatively, the global credit card can be used to store other credit cards and can be used as a credit card itself: If used as a credit card itself, the user can use their global credit card without using an associated PIN. In such a scenario, the authorization request can be sent from the merchant through a gateway to the merchant's chosen processor. From the first processor, the request can be sent to the network and finally to the identity management system 100. The transaction can be recorded, and, if the user has sufficient funds in their account, an authorization message can be sent to the merchant. Otherwise an authorization declined message can be sent. Users can use the identity management system 100 to assign each transaction to a bank or credit card of choice. At regular intervals, the identity management system 100 can collect requests and send user's requested transactions to the issuing banks. If sufficient funds are available, the user's account can be credited and money can be collected from the issuing bank. If sufficient funds are not available, the user's account will not be credited, which will be reflected in the user's account. If the user does not assign the transaction to any of the other banks, the user's account with the identity management system 100 will be affected. In such case, the identity management system 100 can act as a credit card company.

Introduction of a third processor into existing credit card systems could disturb cost equilibriums in the credit card authorization process and could result in the incurring of extra charges. The extra charges could result, because when data travels to each processor, a percentage of the transaction amount is deducted in favor of that processor. Thus, adding a third processor can increase the charge. In existing credit card systems, any such extra charge is pushed back to the merchants. Merchants have come to accept such charges to compete for customers who prefer to use credit cards. Accordingly, a new system that produces new costs will either have to absorb the costs itself or push those costs to the merchants. Therefore, exemplary embodiments of the present invention can reduce/avoid any extra costs incurred by introducing the identity card 145 into the credit card system. To eliminate such extra charges, exemplary embodiments can use an "On-Us" approach. For example, the entity creating the extra charges (the entity maintaining the identity verification system 100) can partner with banks or other financial institutions to eliminate those extra charges. Additionally, such an approach can eliminate the need for a third processor, as the second processor can be used to perform both the identity authorization and the financial (credit card) authorization. Alternatively, negotiations can take place with banks or other financial institutions to lower or eliminate such charges. As will be recognized, such negotiations can take many shapes and forms, with various incentives, give-backs and concessions made between the parties to reduce or eliminate such charges. However, with the negotiation approach, a third processor would still be used.

Figure 16:
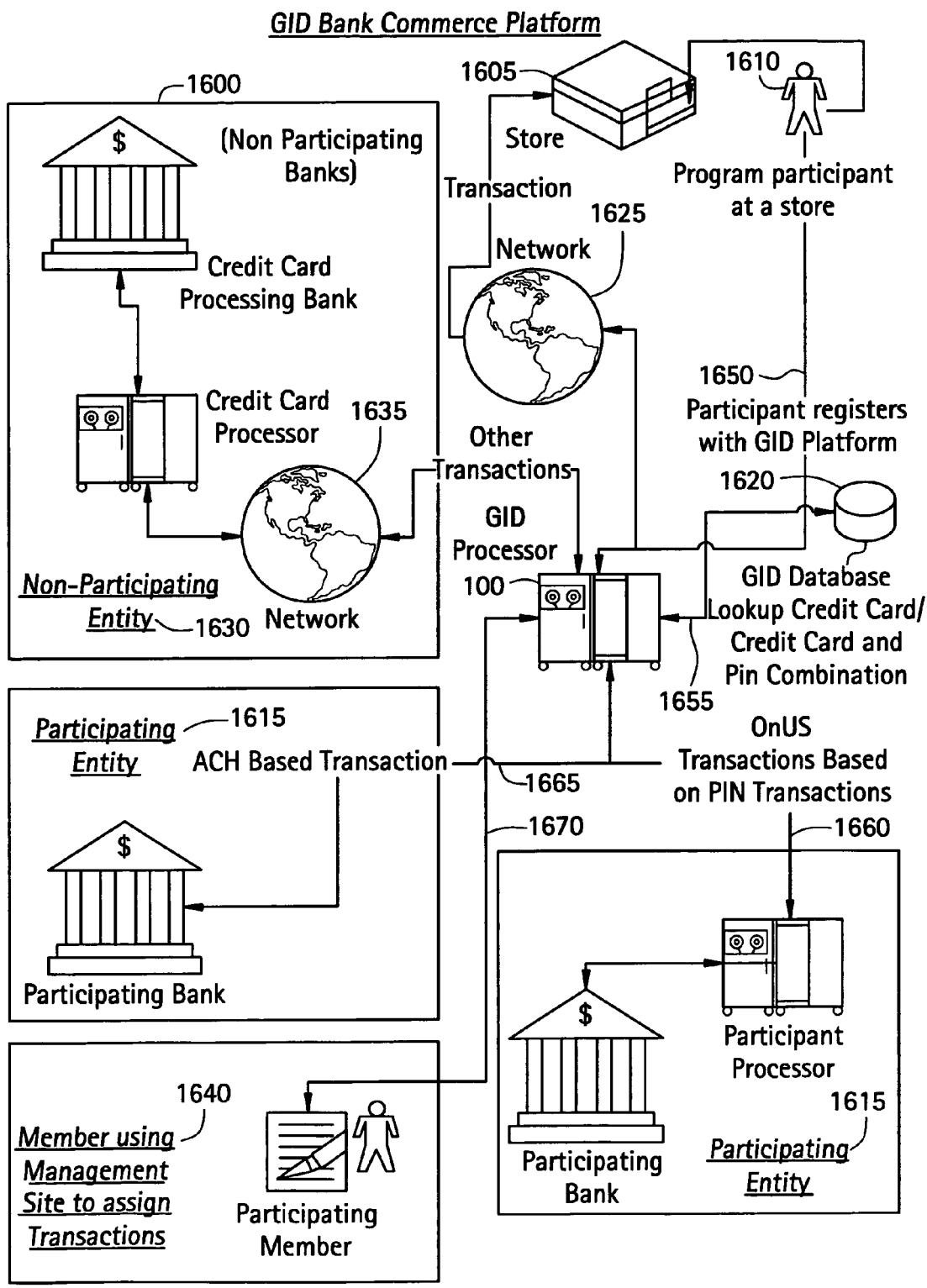
FIG. 16 is a diagram illustrating a commerce platform for the identity management system, in accordance with an exemplary embodiment of the present invention.

FIG. 16 is a diagram illustrating a commerce platform for the identity management system 100, in accordance with an exemplary embodiment of the present invention. To participate in transactions at a store 1605, a user 1610 can register with the identity management system 100 (also referred to as a "Global Identity (GID) processor") (see flow 1650). For example, if the bank of the user 1610 is a participating entity 1615 of the commerce platform network 1600, then the user 1610 can be automatically registered by opening, for example, a credit card or the like with the bank and having the bank issue the credit card to the user 1610. The credit card can be, for example, an identity card 145 or the like associated with the identity management system 100, and can have a suitable PIN number associated with the card to identify the card as an identity card 145. Alternatively or additionally, the user 1610 can associate one or more credit cards with an identity card 145, with each credit card assigned a unique PIN number so that the user 1610 can choose which credit card(s) to use at the time of the transaction. Thus, according to exemplary embodiments, the PIN number can be used to identify the card as an identity card 145 and to select the credit card to use for the transaction, while the credit card numbers can be used to identify the correct issuing bank.

When the user 1610 participates in a transaction at the store 1605, the user 1610 can enter the PIN or other identifier associated with the identity card 145. The transaction information, including, for example, credit card and PIN numbers, can be passed to the identity management system 100 (see flow 1650). The identity management system 100 can query a suitable database to look up or otherwise retrieve the credit card and PIN number combination (see flow 1655). Such information can allow the identity management system 100 to determine the particular bank (e.g., participating entity 1615) that issued the credit card. Once such a determination is made, the identity management system 100 can query or otherwise access the account information for the user 1605 from the proper participating entity 1615 (e.g., for no fee since it is a participating entity). The transaction information, can then be routed to the proper participating entity 1615 from the identity management system 100 to complete the transaction (e.g., an "OnUs" transaction based on the PIN numbers—see flow 1660). The completed and authorized transaction information can then be passed from the participating entity 1615 through the identity management system 100 using the corresponding network 1625 (e.g., the credit card network or the like) to the store 1605 to finish the transaction. The identity management system 100 can perform any suitable type of transaction exchange with participating entities 1615, such as, for example, ACH-based transactions to transfer money (see flow 1665) to settle charges made by the user 1605 or the like.

However, entities that do not participate in the commerce platform according to exemplary embodiments (referred to as non-participating entities 1630) can still use the commerce platform network 1600 to perform transactions. For example, the transaction information received by the identity management system 100 from the user 1610 at the initiation of a transaction can be forwarded by the identity management system 100 to the appropriate non-participating entity 1630, for example, based on the credit card number. Although the identity management system 100 may not be able to access the account information of the user 1610 from the non-participating entity 1630, the identity management system 100 can still perform appropriate transaction routing functions to route the transaction information to the non-participating entity 1620 via the network 1635 (e.g., a credit card network or the like). Alternatively or additionally, the identity management system 100 can perform suitable transaction exchanges with the non-participating entities 1630. For example, the identity management system 100 can perform ACH-based transactions or other electronic funds transfer to transfer money to, for example, settle charges made by the user 1605 and other like transactions. Thus, for example, with either participating or non-participating entities 1615 and 1630, the user 1605 can have their account debited or otherwise charged by either direct access to bank account of the user (e.g., via a participating entity 1615) or by having the identity management system 100 use electronic funds transfer systems, such as an ACH-based transaction system, to interact with non-participating entities 1630 to settle such transactions.

As noted previously, the user 1610 can participate in a transaction at the store 1605 by entering the PIN number along with the credit card information (e.g., by swiping the card at an appropriate purchase terminal). By using the PIN number, the user 1605 can choose the credit card(s) to which the transaction is to be assigned at the time the transaction is being made. However, according to an alternative exemplary embodiment, the user 1610 can simply enter the credit card information, thereby not assigning the transaction to any particular credit card at the time of the transaction. In such a scenario, the identity management system 100 can hold the transaction, while still authorizing the charge. After the transaction takes place, the user 1605 can then log into or otherwise access their account on the identity management system 100 (e.g., through a suitable graphical user interface over, for example, the Internet or World Wide Web) (see flow 1670). The user 1605 can then use the identity management system 100 to assign the transaction(s) to one or more accounts (e.g., credit card accounts or the like) in block 1640. Once assigned, the identity management system 100 can then perform suitable interactions with either or both of the participating and non-participating entities 1615 and 1630 to settle the transaction (e.g., through proper money transfers, charge reconciliations or the like). As discussed previously, in such a scenario, the identity management system 100 can act as a credit card company.

To conduct the financial transaction, the identity management system 100 can perform steps, such as: checking the identity card 145 to ensure that it is valid and not marked as compromised (e.g., lost) by the owner; checking to ensure that the identity card 145 has not been restricted based on the location, type or any other restrictions imposed by the user; verifying that the person meets the minimum identity score requirement of the merchant; checking for any additional restrictions and other like steps. Once the initial verification has been performed, the identity management system 100 can automatically send the credit card information (including the financial transaction information, such as amount of purchase and the like) to the appropriate credit card processing company. The credit card processing company performs the account processing in the conventional manner and returns an answer (e.g., financial transaction is accepted or denied). The answer can be relayed from the identity management system 100, either directly or indirectly, to the merchant, thus completing the financial transaction.

According to an alternative exemplary embodiment, a form of payment can have more than one pass code associated with it. For example, each pass code can impose certain restrictions on a transaction. For instance, a parent can enter the form of payment information under the identity account of their child. Using one pass code, the parent can restrict the transaction to a certain dollar amount. However, using another, different, pass code, the parent can increase this spending limit. For purposes of illustration and not limitation, the child can enter a store and decide to make one or more purchases. During the checkout, the child can use a first pass code to make a purchase which limits the expenditure to only non-alcoholic items under a total of $100.00. However, if the child is stranded and is required to make an emergency transaction that may exceed the $100.00 limit, the child can be provided with an additional emergency pass code, different than the first pass code, that does not impose any limitation on the expenditure.

In addition, there can be situations where it may not be possible to enter a pass code upon purchase, such as restaurant payment. In these situations, the account number of a form of payment (e.g., a credit card number) stored or otherwise located on the identity card 145 can be designated as a default form of payment with certain restrictions. The default form of payment can be automatically selected from the identity card 145 for the purchase transaction. For example, the user can designate an AMERICAN EXPRESS™ card to be the default form of payment. The default form of payment can also be subject to certain rules, with the rules being the set of restrictions and requirements that the user imposes on the use of the form of payment. The rules for the default form of payment can include, for example, the maximum amount that can be charged for this form of payment, the venues in which the form of payment can be used, the geographical areas in which the form of payment can be used, or any other suitable rule. However, multiple different default forms of payment can be associated with the identity card 145, with each default form of payment being used for different purposes. For example, for restaurant purchases, the default form of payment can be the aforementioned AMERICAN EXPRESS™ card. However, for clothing purchases, a Visa card can be default form of payment. The rules for the default form of payment associated with an identity card 145 can be establish to use any suitable number of forms of payment (credit cards, debit cards, checks, and the like) for any types of purchases or transactions.

According to an alternative exemplary embodiment, multiple pass codes can be entered, so that the purchase or other financial transaction can be divided or otherwise split based on the rules associated with each of the multiple forms of payment stored along with a user's identity profile. For example, if a first credit card has a pass code of 12345 and second credit card has a pass code of 98765, entering a code of 1234598765 would cause the purchase transaction to be performed based on the rules imposed on both credit cards associated with these respective pass codes (e.g., a union or other accumulation of the respective rule sets). Consequently, for purposes of illustration and not limitation, a $5000 transaction can be divided between the credit card assigned to pass code 12345 and credit card assigned to pass code 98765. Although the merchant will see the transaction as a single purchase transaction, for the transaction to proceed, both of the respective credit cards are checked and suitably verified by the identity management system 100. The purchase transaction split can be specified in the pass code that is entered by the user. For example, a $5000 transaction can be split by assigning $1000 for the pass code 12345 and $4000 for the pass code 98765. The resulting pass code can be entered as, for example, 1234510009876540000 or the like.

According to an alternative exemplary embodiment, instead of using an identity card 145, the identity information associated with the identity card 145 can instead be integrated with any other suitable form of payment and/or identification issued by another institution. For example, a credit card issued by a financial institution can be configured to include a user's identity number either on the credit card or associated with the credit card number (e.g., in the financial institution's database), thereby allowing an integration with the identity information available from the identity management system 100. Thus, a user can use a form of payment, such as a credit card, and still have the form of payment checked for all of the restrictions imposed by the user through the identity management system 100 on the particular form of payment.

For purposes of illustration and not limitation, assume a user applies for a Visa credit card. The issuing bank can associate the user's identity information with the credit card being issued. The user can then impose restrictions on the use of the credit card account through the identity management system 100 (e.g., the credit card cannot be used outside of the United States). When the new credit card is used (without any accompanying identity card 145), the credit card company can check with the identity management system 100 to determine whether there are any restrictions imposed on the purchase transaction for the given credit card. For example, if the credit card cannot be used outside of the United Sates, then an attempt to make a purchase in Taiwan would be rejected.

Such integration is not limited to credit cards or other similar forms of payment, but can also be used in association with suitable forms of identification, such as, for example, a social security card. For example, the social security card can be configured to contain or be associated with the identity information of the user, so that the use of social security card number can also be restricted through the identity management system 100. In such an embodiment, for example, a user can provide its social security card to a prospective employer without fear of the social security number being stolen or used for fraudulent purposes. As with the credit card number illustrated above, before the social security number can be used for any purpose, such as, for example, reporting a 1099 Form to the Internal Revenue Service (IRS), the IRS can first check with the identity management system 100 to verify that the user has allowed the use of the social security number by the given employer, thereby ensuring that the employer is not making fraudulent claims.

Although numerous illustrative examples have been given in which a credit card has been discussed as a form of payment, other forms of payment can be used according to exemplary embodiments of the present invention. For example, the identity management system 100 can be configured to store the routing number and the bank account number for checks. A user can then assign a rule for use of the check information, and one or more pass codes can be issued to allow use of and access to this check information. For example, during a purchase transaction, a user can enter identification information (e.g., via the identity card 145) and the (check) pass code into the merchant's POS system. The identity management system 100 can determine if the purchase transaction satisfies the rule(s) that apply to the use of the check information. If so, a new (i.e., the next) check number can be issued and the check can be verified against the bank account (e.g., to determine if there are sufficient funds). Once verified, the merchant can receive a verification code or other unique number that can be used for an electronic deposit or electronic funds transfer from the bank account of the user to the bank account of the merchant. Such an embodiment can eliminate the need for a user to carry and write checks to perform purchase and other financial transactions. Other forms of payment can be maintained by and used in accordance with exemplary embodiments of the present invention.

According to exemplary embodiments, the same process that is used for identifying a user in the United States can be adapted for identifying a user in a foreign country, such as, for example, Germany, using identification documents native to that country (e.g., German identification documents). For example, a European Union identification card can be used instead of a social security card for purposes a creating a German user's total identification score. However, the meaning of the total identification score and/or the meaning of the CONFIDENCE FACTOR™ does not change for different geographical regions. For example, when a total identification score of 70 is assigned to a user in the United States, if the same total identification score is assigned to a user in Germany, these two users are considered to be completely equal in their level of identity. Thus, if the two users with equal total identification scores travel to another country, such as India, their identification scores represent a level of identity that is equal to an Indian resident with a total identification score of 70. According to exemplary embodiments, then, the identity card 145 can be used as a type of "global identification card." As such, a foreign user traveling in the United States and having a total identification score of 70 can be treated equally to a United States citizen with a similar total identification score, regardless of the nationality of the foreign user. For example, providing the user's identity card 145 along with a check as a form of payment can ensure that the transaction is treated equally, regardless of where the user originates from and from which country the check is issued. Since the level of identity of a user can be uniformly ascertainable throughout the world according to exemplary embodiments, any transaction can be performed anywhere as safely as if it were performed in the user's native country.

In addition, since the identity card 145 can be associated with any form of identification or financial information, the usage of the identity card 145 anywhere in the world can be tracked for the user and logged for immediate or later access through the identity management system 100. Consequently, the user can track the usage of the identity card 145 in different geographical locations, thereby providing the user with a global record of not only the use of the user's identity and identification information, but also the user's financial information. Other characteristics or behavior of the user can be tracked in such a manner. For example, as the identity card 145 is used for purposes of travel (e.g., as the identity card 145 is swiped or otherwise recorded at identity checkpoints, such as airports or other like points of embarkation and disembarkation), a record of the user's travel can be maintained. Thus, a user's travel, both nationally and internationally, can be monitored and logged, thereby allowing the user to track travel with the identity card 145 in different geographical locations. Other such characteristics or behavior can be tracked using the identity card 145.

According to an exemplary embodiment, the identity management system 100 can be based on a distributed model that allows users to maintain and host their identity and related information according to a Global Identification Number (GIN). The GIN can be any suitable form of alpha-numeric or other identifier that is capable of uniquely identifying a user. The distributed model can be implemented through a service called, for example, Global Identity Services (GIS), as discussed below. The GIS can allow both authoritative and non-authoritative hosting of data and perform information routing based on the GIN.

As used herein, an "authoritative organization" is an entity or other user whose purpose is to securely maintain identity and identity-related data and information that is globally accessible by other entities. The data and information maintained by the authoritative organizations is trusted by other users and is accepted by any user that "joins" or otherwise uses the identity management system 100. Each of the authoritative organizations would be required to obtain an organizational GIN (OGIN).

As used herein, a "non-authoritative organization" is any other entity or user that chooses to provide limited or no access to identity and identity-related data and information, for example, to maintain the privacy or confidentiality of the data. Such non-authoritative organizations do have the ability to obtain data from (authoritative) partners through the GIS. However, the non-authoritative organizations would not be required to obtain an organizational GIN, unless they choose to share their identity and identity-related data and information with another organization.

Figure 7:
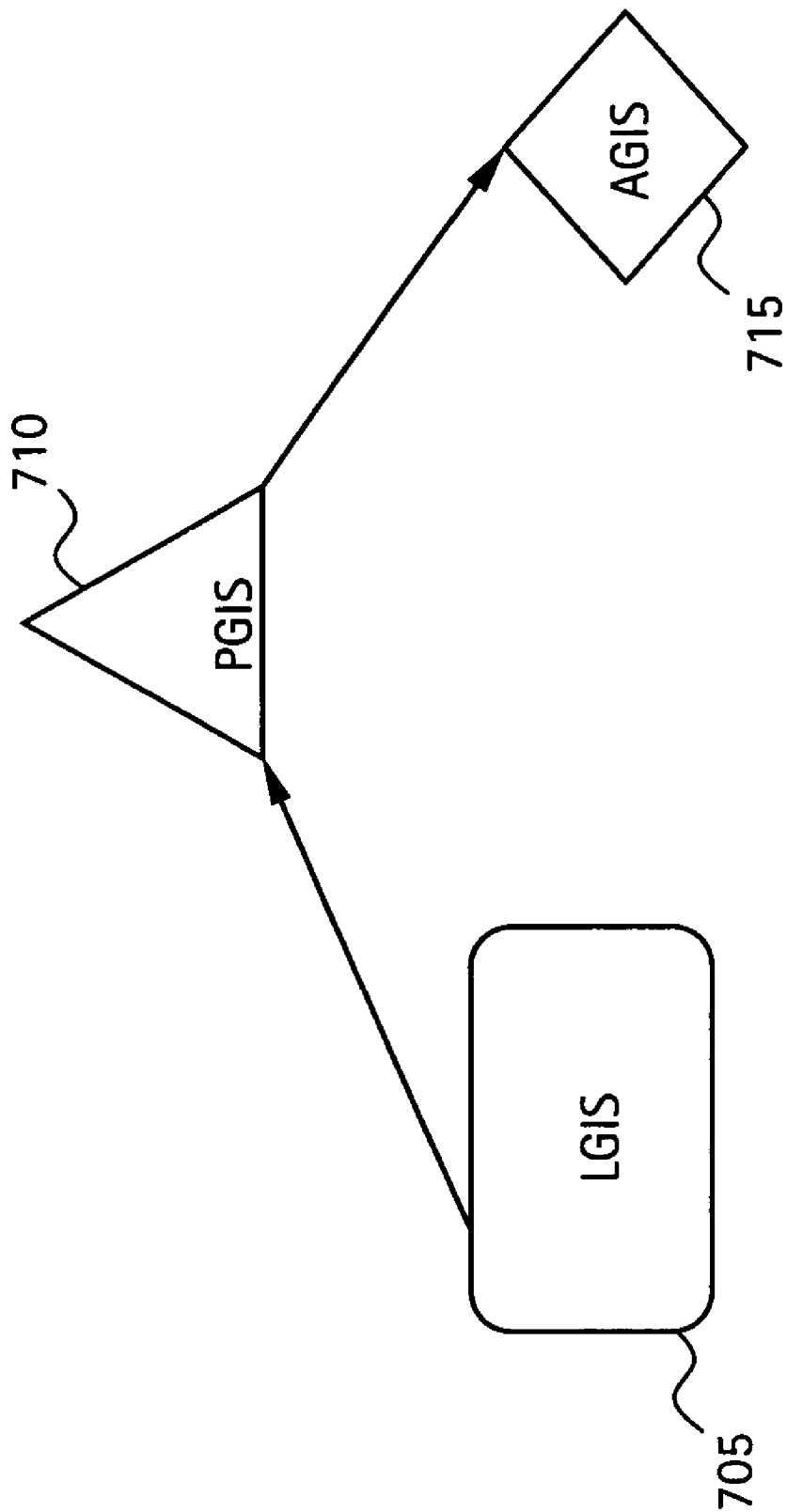
FIG. 7 is a diagram illustrating information routing for GIS, in accordance with an exemplary embodiment of the present invention.

According to exemplary embodiments, a primary function of the GIS is to provide a routing mechanism for data stored in various locations. FIG. 7 is a diagram illustrating information routing for GIS, in accordance with an exemplary embodiment of the present invention. When an entity requests services (e.g., retrieval of identity information or the like) associated with the identity management system 100, the request is first routed to the Local GIS (LGIS) server 705. If no LGIS server exists, the request is directly sent to the Primary GIS (PGIS) server(s) 710. Otherwise, if an LGIS server 705 exists, and this server can satisfy the request (e.g., the identity information resides on that LGIS server 705), the request is immediately fulfilled. If the LGIS server 705 cannot satisfy the request (e.g., the identity information does not reside on that LGIS server 705), the request is forwarded to one of the PGIS servers 710. The PGIS server 710 processing the request finds the Authoritative GIS (AGIS) server 715 associated with the request and sends the request to that server. The AGIS server 715 satisfies the request by, for example, retrieving and returning the requested information to the requesting entity. If the information is not located at the specified AGIS server 715, an error or other like indication can be returned to the requesting entity (e.g., to indicate that the identity information cannot be located or otherwise retrieved). The LGIS server(s) 705, PGIS servers 710 and AGIS servers 715 can communicate with each other any suitable type of network or computer connection.

According to an additional exemplary embodiment, the identity management system 100 can conform to and is compatible with the Federation model. A Federation is an association of organizations that come together to exchange information as appropriate regarding their users and resources to enable collaboration and transactions. For example, members of a Federation can easily integrate and use all or parts of the identity management system 100 (or corresponding commerce platform or e-commerce platform) that can enable them to use the services offered by such platforms.

Figure 8:
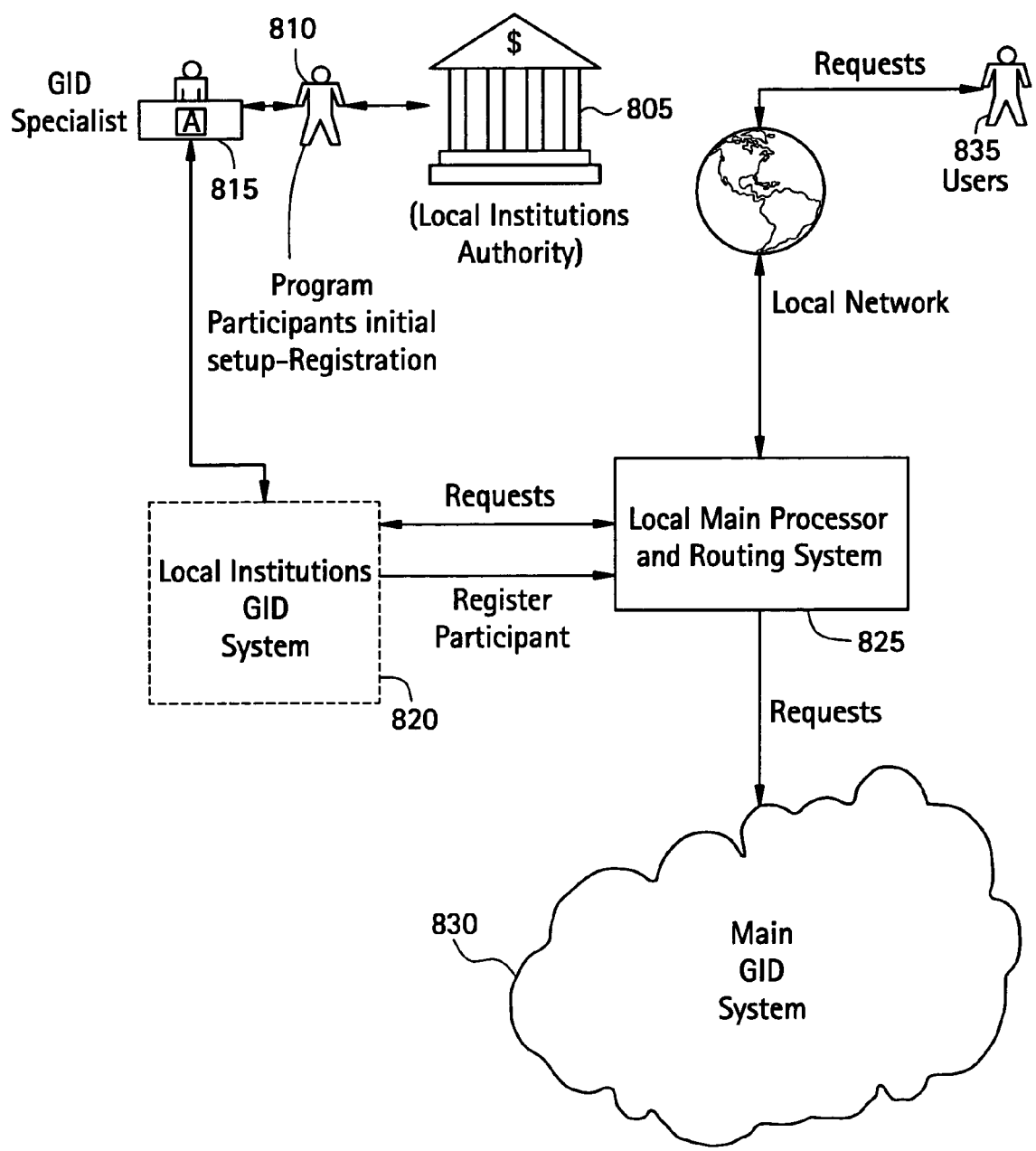
FIG. 8 is a diagram illustrating the identity management system distributed platform model, in accordance with an exemplary embodiment of the present invention.

FIG. 8 is a diagram illustrating the identity management system 100 distributed platform model, in accordance with an exemplary embodiment of the present invention. In FIG. 8, a bank 805 is a participating bank that can be responsible for holding the identification information of a member 810. The member 810 is an individual or entity who desires to have their identity protected. An identity specialist 815 is, for example, a bank agent or the like specially trained to assist the members 810 in creating their global identification account. A local institution global identity (GID) system 820 can include a licensed GID appliance and platform which the banks 805 can use to store identity information of members 810. The GID appliance can be connected to a GID main processing and routing system 830 so that it can be located by other local GID systems 820. A local main processor and routing system 825 is the main routing system that can control the local institution GID systems 820. The main GID system 830 is the global center for all connections between the local institution GID systems 820 and the banks 805. The users 835 are institutions or the like that can request access to information associated with a member 810 through the network.

Figure 9:
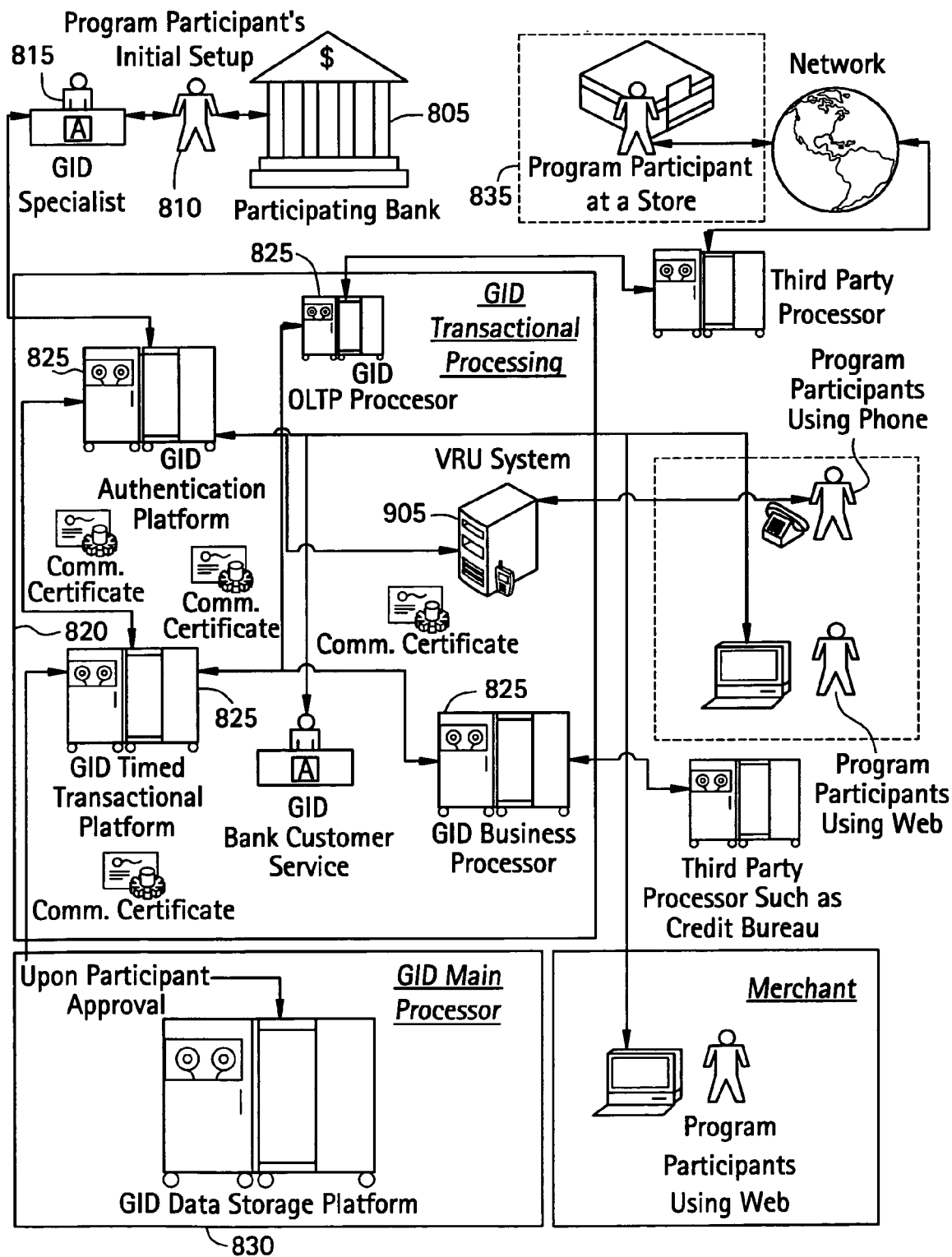
FIG. 9 is a diagram illustrating an exemplary architecture for the identity management system 100 platform, in accordance with an exemplary embodiment of the present invention.

FIG. 9 is a diagram illustrating an exemplary architecture for the identity management system 100 platform, in accordance with an exemplary embodiment of the present invention. For a client to have their identity protected, the client can visit the bank 805 and meets with a bank agent, such as an identity specialist 815, who can assist the client in creating their identity account (and credit card account) to become a member 810. Once the account is created in the bank 805, the member 815 can then use the identity management system 100 to manage their identity account (and/or credit account). Once an account has been configured, the member 815 then can use the identity card 145 to provide access to the users 835 or other institutions to information stored in that account.

The information can be accessed in one of several ways. For example, the member 810 can visit a participating merchant. If the member 810 wishes to open an account with the merchant, instead of writing all of the information on the account application, the member 810 can swipe their identity card 145 and enter the corresponding PIN assigned to the identity card 145. The merchant can send the information provided by the identity card 145 and PIN to the network, which can be routed to the GID main processor (e.g., GID main system 830). The GID main processor can use the account information to retrieve and decrypt the relevant identity information and encrypt it with the participating merchant's key. The encrypted identity information can be communicated from the GID main processor to GID transactional processing (e.g., local main processor and routing system 820) for the participating merchant. The participating merchant can then use its log-in or other unique identifier to access the identity information to complete the account application. In case the participating merchant cannot access a card swiping system or if the system is off-line for some reason, the member 810 can use an automated voice response (VRU) system 905, a live customer service center or the like to authorize the transfer of identity information. The merchant can also access the voice response system or customer service center to obtain the identity information (with the authorization of the member 810), in case the identity management system 100 is not available through the direct connection.

Those of ordinary skill in the art will recognize that the identity management system 100 can be implemented in a variety of ways. According to one exemplary embodiment of the present invention, a secured databank and system can be created by which the identity of individuals or businesses can be managed and accessed. Initial access by the user to the system can be through a bank or other trusted local organization or entity. For example, an identity theft specialist at the bank can receive users who want to subscribe to this system. At the bank, the identity theft specialist can first educate the customer on the identity management system 100. Following the education session, the identity theft specialist can ask the user for identification papers, such as a social security card, birth certificate, driver's license, proof of residency (passport, Green Card), proof of domicile, or the like. After examining the paperwork, the identity theft specialist can login to the identity management system 100 (e.g., through graphical user interface 170) to create a unique user number.

After the user number has been assigned, the user can create a PIN. Selection of the PIN can be done by the user without any access by the identity theft specialist. The user must memorize the PIN. For example, if the PIN is lost or forgotten, the user must return to, for example, the bank to have the PIN reset. The identity management system 100 can then create an identity account for that user. The user can also create, for example, a Global Credit Card account or the like, as discussed previously, to allow identity management on a global basis. The user will, for example, have an audit trail of all or substantially all of the transactions that occur on the Global Credit Card account and the associated stored cards. Coupled with the alert system, the user can track any transaction charged to their account. If created, a separate card with a credit card number can be issued to the user. The user can program, for example, all of the user's credit card accounts onto this card through access to the identity management system 100 (e.g., via graphical user interface 170). The user can additionally limit the use of each credit card (or other cards) by placing limits or other restrictions on each card, as discussed previously. An identity card 145 holding the unique user number can be mailed to that user's address (or to the bank, if user wishes).

Using the Internet or the World Wide Web, the user can then have access to the user's identity and credit card accounts maintained by the identity management system 100. Initially, when the user logs in to their account, the user can use the card number for a login name and the PIN for a password. However, once access to the user's identity account in the identity management system 100 has been obtained, the user can change their login name password to any unique login name and password.

Through the identity account, the user can have many options. For example, the user can receive alerts, for example, regarding their identity use or improper uses thereof. The user can receive requests for identity authorizations, such as, for example, requests for the use of the user's identity. The identity account can also allow the user to monitor identity account activity, monitor credit card activity, make and/or receive credit card payments, and any other identity- and financially-related transactions, such as, for example, prepaid cards, gift cards, debit cards, ATM cards and the like. As discussed previously, the identity management system 100 can also allow the user to input credit card information. For each credit card number, the user can choose a unique PIN, with the PIN for each credit card being different from the PIN used for identity access purposes. Consequently, the user need only carry a Global Identity Credit Card (e.g., identity card 145) instead of several different cards, such as, for example, credit cards, debit cards, gift cards, ATM cards and the like. For example, once at the Point-of-Sale, the Global Identity Credit Card can be used along with the PIN associated with one stored credit card to make transactions with the given credit card transaction. However, as discussed previously, the user can user one or more credit cards for the transaction, based on the sequence of PIN numbers entered. However, the vendor will not have access to the actual credit card number.

The identity system management 100 can also support ACH/EFT (Automatic Clearing House/Electronic Funds Transfer). An alert system can be associated with the use of the Global Identity Credit Card and the associated stored cards. For example, when a purchase takes place, an alert can be sent to the user's alert receiving device (e.g., mobile phone, PDA, e-mail or the like) about the occurrence of a transaction. Such an alert can further include suitable accompanying information, such as, for example, amounts, merchant identification, location and other like information.

For example, when applying for a mobile phone plan, the user can use the Global Identity Credit Card number. By entering the PIN associated with the identity of user and the credit card for the transaction, the user can authorize the identity management system 100 to reveal required identity and financial information to the business, for example, once or for a limited time. To ensure identity protection, authorized persons at the business or stationed at the headquarter of the mobile phone company can have viewing privileges for the identity and financial information, but their access is recorded. The identity management system 100 can also provide credit status to a requesting party as well. For example, the identity management system 100 can establish a network or computer connection to a credit reporting agency to retrieve a user's credit report. Each time a credit report is retrieved from the credit reporting agency, the corresponding credit history, credit score and the access can be recorded for the user to review.

According to an exemplary embodiment, credit card transactions can go through the identity management system 100. Consequently, limits on the credit card(s) can be applied and each transaction can be recorded, thereby ensuring the identity and financial safety of each transaction. For places where inputting a PIN is not feasible, a default system can be available. For example, when no PIN is entered, a specified default credit card can be charged. Using the identity management system 100, restrictions such as, for example, amount, geographic or vendor type, can be placed on the default credit card. For example, the default credit card without a PIN could only be used in, for example, restaurants. Additionally, a CONFIDENCE FACTOR™ can also be assigned to each user. For example, the longer the user remains with the identity management system 100, and based on the authenticity of the documents the user presented to the identity theft specialist at the bank, the user's CONFIDENCE FACTOR™ can be increased. As noted previously, the CONFIDENCE FACTOR™ can be used as an additional or alternative measure of the validity of a user's identity.

Following the establishment of an identity with the identity management system 100, users can engage in trade with businesses or perform any other suitable transaction in which identity is a component. For example, for online transactions, a one-time use PIN can be generated for a credit card maintained in the identity management system 100, thereby not comprising the original PIN. To ensure identity safety, the one-time use PIN can be retrieved from identity management system 100 during the online transaction (e.g., at time of payment). Alternatively, upon request, a PIN can be generated periodically (e.g., at predetermined intervals) for a user and sent to, for example, the mobile phone, PDA, pager, e-mail address or the like of the user. The user then does not need to access the identity management system 100 each time a one-time use PIN is required.

The identity management system 100 can also functions as a fund transfer system for, for example, on line auctions or other transactions. For example, buyers and sellers can communicate through the identity management system 100 and transfer funds by credit card or check, because the identity of each user is established and verified in the identity management system 100. If users provide or otherwise authorize distribution of their CONFIDENCE FACTOR™ to other users, the CONFIDENCE FACTOR™ can also assist in the decision making of each party.

According to exemplary embodiments, any or all information maintained or otherwise stored in, for example, databases in the identity management system 100 can be encrypted using any suitable encryption technique. According to an exemplary embodiments, information and data stored in the identity management system 100 databases can be stored using a double encryption system. A double encryption system operates in a manner similar to a safety deposit box, where the owner of the box has one key and the bank has another and both keys are required for the information to be unlocked.

For example, the identity information stored in the identity management system 100 database can be encrypted by a first key that the identity management system 100 maintains, and also by a second key that the user maintains. Both encryption keys would be needed before the identity information can be decrypted and viewed. Such encryption can ensure that the data stored will be secure from hackers and other malicious attacks. Such encryption techniques can further ensure that even if the information or data was hacked, such information could not be decrypted without the presence of both the identity management system 100 key and the user's key. Additionally, the key maintained by the identity management system 100 can also change per record or otherwise periodically to ensure further security.

According to an exemplary embodiment of the present invention, the identity management system 100 can also be used for e-commerce transactions or other purchase transactions. The identity management system 100 can include a transaction order generation module 150 in communication with, for example, the total identification score generation module 115. The transaction order generation module 150 can be configured to generate a transaction or purchase order using the total identification score of the user. For example, before making a purchase, either online or in person, the user can generate a transaction order using the transaction order generation module 150 (e.g., by logging into the identity management system 100 and making such a request). When making a purchase, instead of using its credit card and personal information, the user can submit the transaction order to perform the transaction. The merchant or other third party can then use the transaction order to gain access to the total identification score, financial information (e.g., credit card number) and personal information (e.g., billing address of the user) to complete the transaction in the manner discussed previously on behalf of the user.

For example, the transaction order can contain an identity access authorization code by which the third party can gain access to the identity management system 100 to retrieve the relevant information. As noted previously, the user can specify different types of restrictions on the use of the user's information maintained by the identity management system 100. Thus, when generating the transaction order, the user can specify, for example, that the transaction order can only be used by a certain third party to perform a certain type of transaction. The third party would then only be able to access the information to which the third party has been restricted. According to an exemplary embodiment, the information retrieved by the third party is maintained by the third party temporarily to conduct the transaction, but then discarded after the transaction is complete. Alternatively or additionally, temporal restrictions can be placed on the information retrieved by the third party using the transaction order, thus limiting the amount of time by which the third party can successfully access and use the user's information. Additionally, once an identity access authorization code is entered by the third party, the third party can be restricted to receive only the funds authorized for the transaction. Thus, the identity management system 100 can be used to conduct the actual transaction on behalf of the third party.

For example, assume that a user navigates a web browser to a website to make a purchase. When ready to enter payment information, instead of a credit card number or the like, the user can enter the number of its identity card 145 and an accompanying pass code. Once the "submit payment" button is clicked, the website can send the information to the identity management system 100. The identity management system 100 can then verify the payment information associated with the identity card 145 and pass code, including all of the rules specified for the use of the particular form of payment (other types of verification can also be performed, such as verifying that sufficient funds are available for the form of payment). Once verified, the manager or other proprietor of the website can receive an authorization number that can be used to receive the payment from the identity management system 100 (e.g., through an electronic funds transfer or the like).

According to an alternative exemplary embodiment, another means by which a purchase (for example, POS, on-line, telephonic or the like) can occur using the identity management system 100 is referred to herein as an "Automated Pre-Authorization." In such an alternative exemplary embodiment, the identity management system 100 can be referred to as a "Global Identity (GID) system" that can be used in conjunction with a "GID network." Such an alternative embodiment can be used to facilitate and secure purchases such as, for example, on-line purchases and the like, and can be based on the "Purchase Order" (PO) concept. For example, to integrate their on-line payment processing system and to become a member, on-line merchants can download an Application Programming Interface (API) from the identity management system 100. Alternatively, the on-line merchant can "officially" register with identity management system 100 to obtain a unique key and certificate, including a set of Application Programming Interfaces (APIs). Such APIs can enable the merchant to create a unique encrypted key based on the information gathered from the client. Various appropriate criteria can be used by the API to create the unique encrypted key, such as, for example, the merchant name, the total invoice amount and other like criteria. Officially registered and un-officially registered merchants can be differentiated for the users by, for example, identity score, CONFIDENCE FACTOR™ or risk factor and the customer can be made aware of the merchant's identity. Such an Automated Pre-Authorization process can be illustrated with the following examples.

Figure 10B:
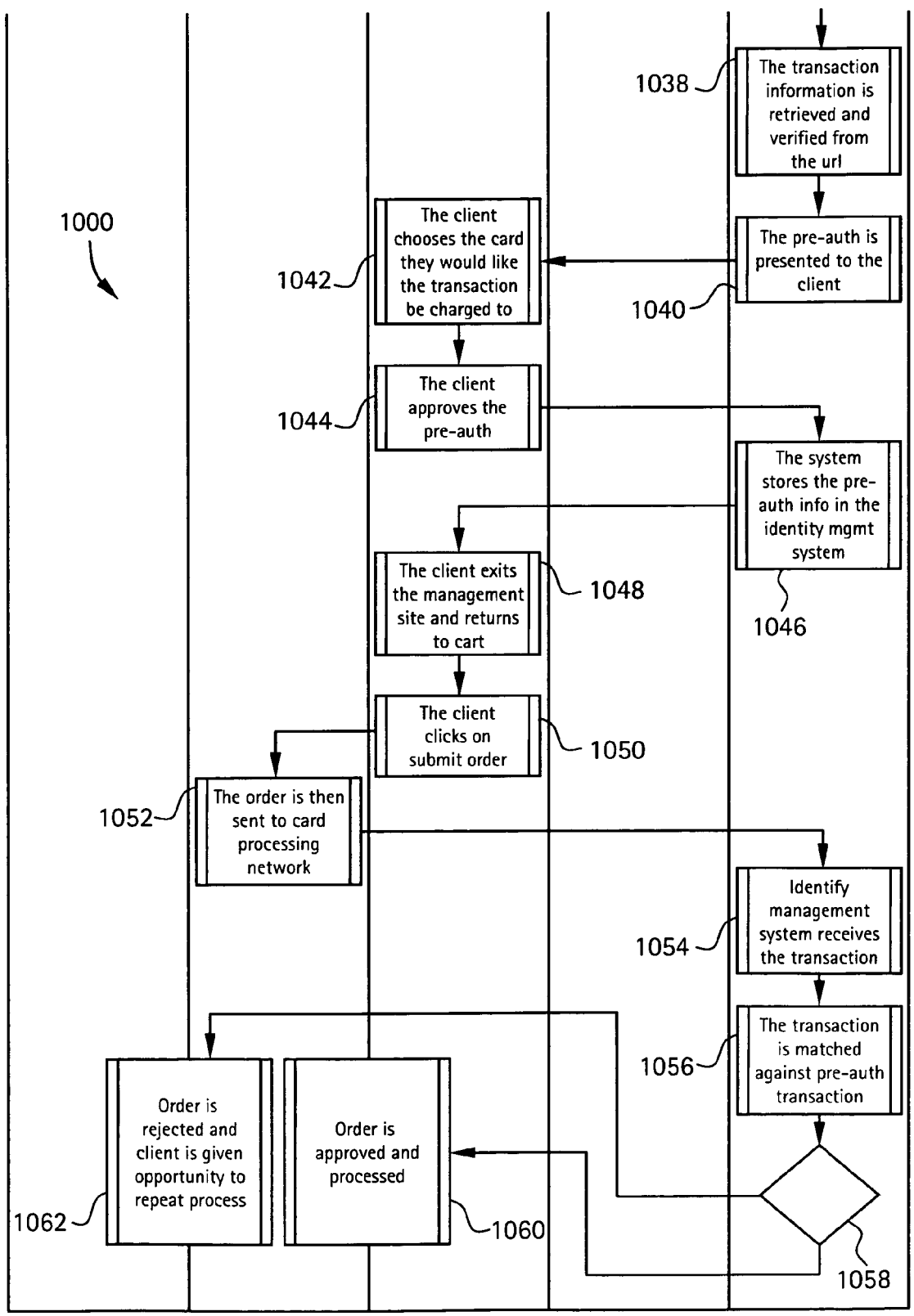

FIGS. 10A and 10B are flow diagrams illustrating a transaction 1000 using an automated pre-authorization process for the identity management system 100 without using a one-time card number, in accordance with an exemplary embodiment of the present invention. As illustrated in FIG. 10A, the transaction 1000 can involve a vendor 1002, a cart 1004, a client 1006, an API 1008 and the identity management system 1010. In step 1012, the vendor 1002 may or may not sign up with the GID network. In step 1014, the vendor 1002 can download the GID e-commerce API. In step 1016, the vendor 1002 can integrate the GID e-commerce API into the e-commerce website of the vendor 1002. In step 1018, the client 1006 can register for a GID card (e.g., identity card 145). In step 1020, the client 1006 can store their other cards in association with their GID card using the identity management system 100.

For purposes of illustration and not limitation, assume that in step 1022 the client 1006 navigates a suitable web browser to a website of the vendor 1002 to make a purchase (these examples are also applicable to, for example, at POS self-checkout counters). In step 1024, the client can make any and all required purchases and then prepare for checkout. When ready to enter payment information, instead of a credit card number or the like, in step 1026, the client 1006 can enter the number of its identity card 145, name, billing address, and other like information. In step 1028, the vendor 1002 can recognize the entered number as an identity card 145 number that belongs to the identity management system 100, and the cart 1004 of the vendor 1002 can pass the cart information to the API 1008. In step 1030, the API 1008 can return a unique URL to the vendor 1002. In step 1032, the cart 1004 of the vendor 1002 can present a link or button to the client 1006 called, for example, "Pre-Authorize Order." In step 1034, the client 1006 can click on the "Pre-Authorize Order" link to pre-approve the on-line transaction and access his/her stored credit cards maintained on the identity management system 100 (e.g., where the user has stored his/her credit cards with restrictions applied to them, and the like). In step 1036, the client 1006 can securely log onto the identity management system 100. The secured login process can include, for example, User ID, pre assigned security questions, encryption keys, pre-assigned pictures, passwords and the like.

Continuing in FIG. 10B, in step 1038, the transaction information can be retrieved by the identity management system 100 and verified from the presented link. In step 1040, the pre-authorization can be presented to the client 1006. In step 1042, the client 1006 can choose to assign the transaction to the identity card 145 or another credit card registered with the system. In step 1044, the client 1006 can submit the pre-approval by clicking on, for example, an "Approve" link or button. In step 1046, the identity management system 1046 can store the pre-authorization information in the system. In step 1048, the client 1006 can exit the identity management site and return to the cart 1004. In step 1050, the client 1006 can complete the purchase through the vendor 1006 site by clicking on a, for example, "Submit Order" button or the like. In step 1052, the transaction request can be transferred from the cart 1004 through the network to the identity management system 100 (which supports the transaction). In step 1054, the identity management system 100 can receive the transaction. In step 1056, the transaction can be matched against the pre-authorization transaction. From the decision step 1058, if the transferred transaction matches the pre-approved transaction (including any the limitations and filtrations such as time, geography, and the like), the transaction can be approved in step 1060 and the results can be sent back to the vendor 1002. Otherwise, in step 1062, the order or transaction can be rejected and the client 1006 can be given an opportunity to repeat the process.

Figure 11A:
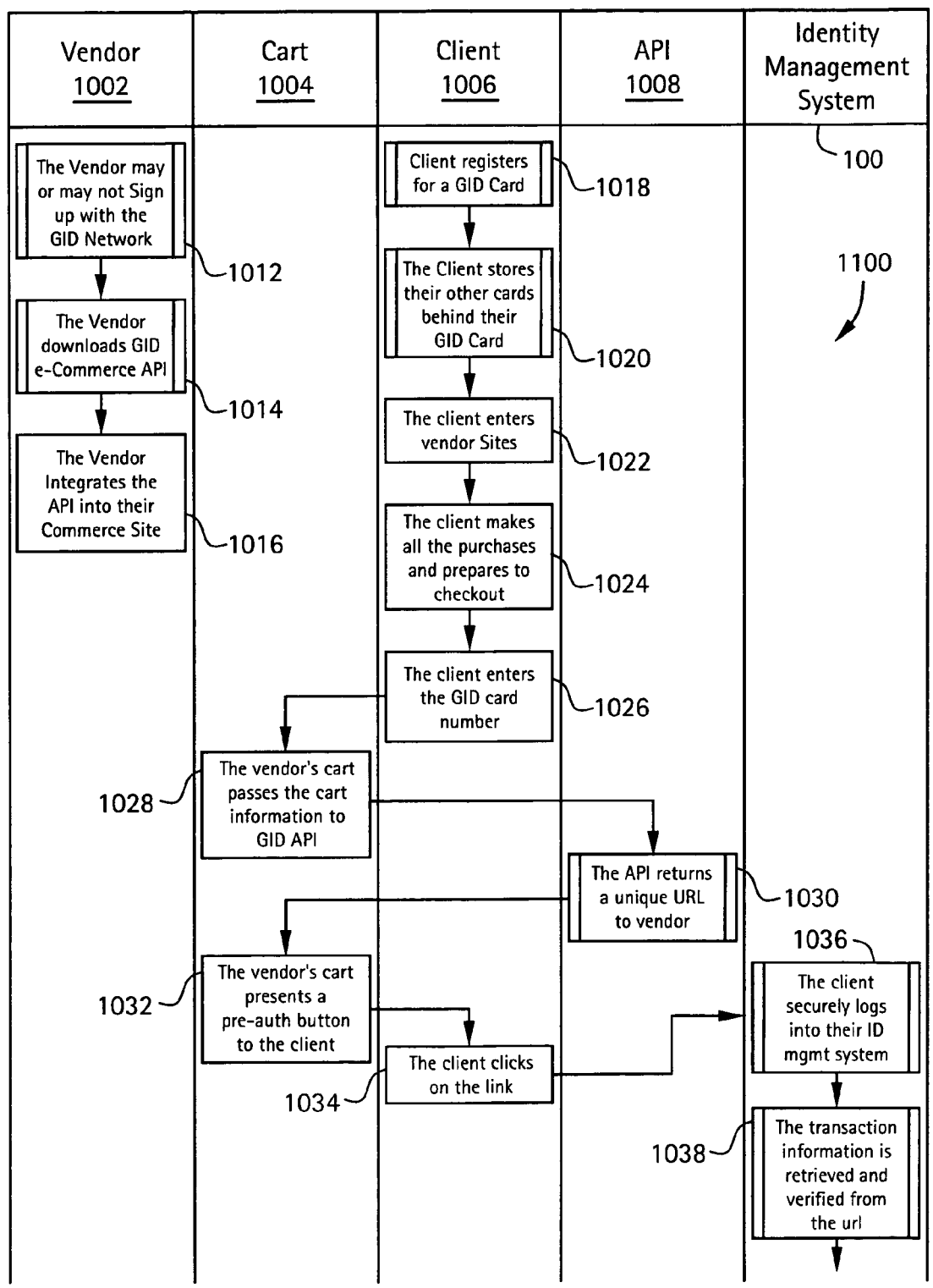
FIGS. 11A and 11B are flow diagrams illustrating a transaction using an automated pre-authorization process for the identity management system using a one-time card number, in accordance with an exemplary embodiment of the present invention.
Figure 11B:
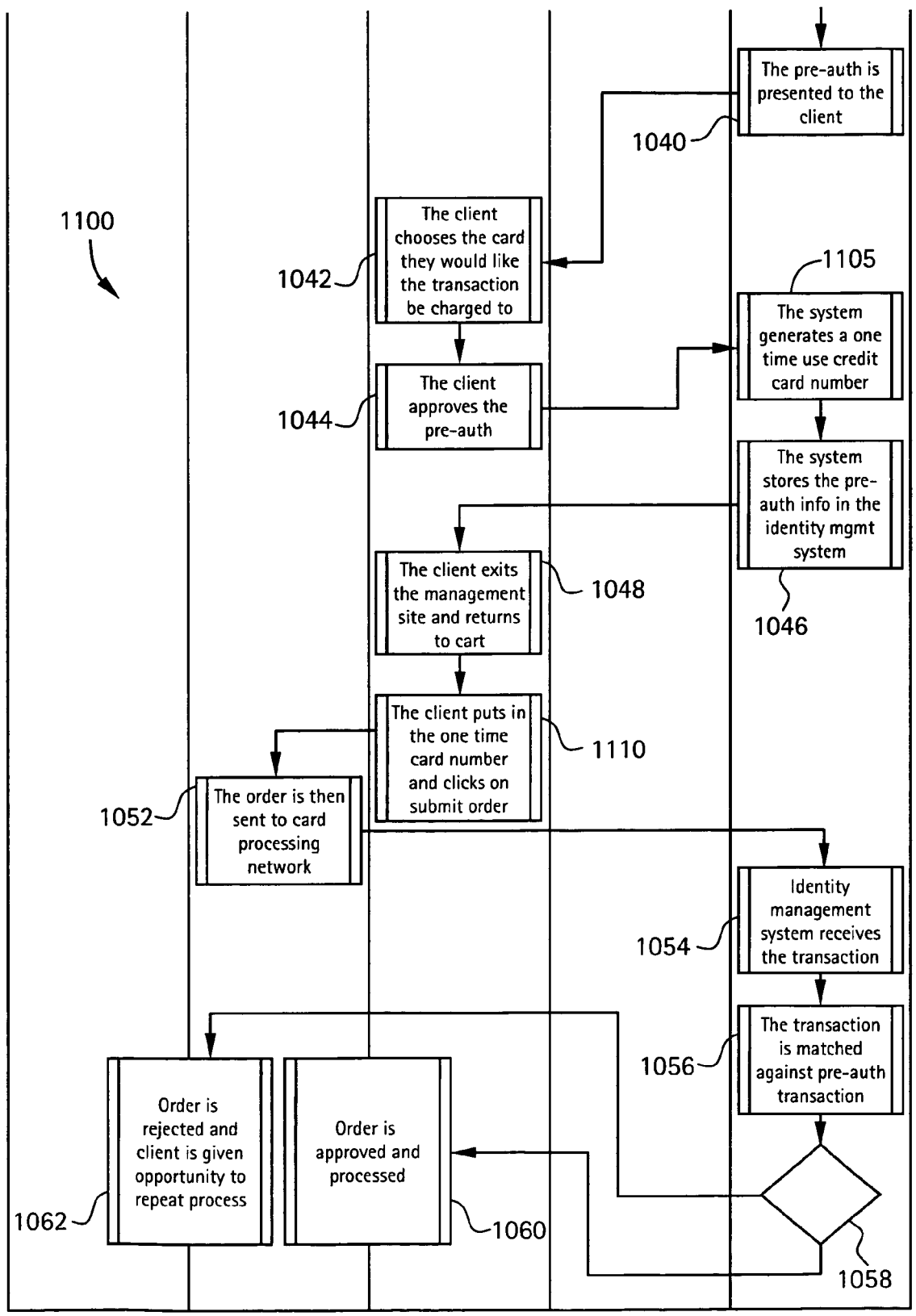

FIGS. 11A and 11B are flow diagrams illustrating a transaction 1100 using an automated pre-authorization process for the identity management system 100 using a one-time card number, in accordance with an exemplary embodiment of the present invention. As illustrated in FIGS. 11A and 11B, the flow of the transaction 1100 can follow the steps 1012-1044 of FIGS. 10A and 10B. However, after step 1044 in FIG. 11B, in step 1105, the identity management system 100 can generate a one-time use credit card number or the like. In other words, in step 1042, the client 1006 can choose which card to charge the transaction to, and the client 1006 can also select to have a one-time temporary credit card number to be generated. In step 1105, the identity management system 100 can then generate a one-time use, temporary credit card number (including, for example, expiration and CVV numbers) or other suitable payment information for the client 1006. The flow of transaction 1100 can continue with steps 1046 and 1048 as discussed previously with respect to FIG. 10B. However, in step 1110 after step 1048, the client 1006 can copy or otherwise enter the generated one-time use credit card number in the credit card number field of the vendor 1006 site (or it can be entered automatically by the system). The transaction 1100 can then be completed in steps 1052-1062 in the manner discussed previously with respect to FIG. 10B. Once the transaction 1100 is completed, the one-time use credit card number becomes invalid and no longer usable in future transactions.

For Point-of-Sale (POS) transactions, assume that a user goes to the POS to purchase an item. If the user uses the identity card 145, the user can receive a request in the form of, for example, a call on his/her mobile phone (PDA, or any other electronic device) from the identity management system 100. The request can provide the user with a choice of approving or not approving the transaction. For example, in the case of the request going through a mobile phone, the user can enter "1" for approving transaction and "2" for declining transaction. If the user chooses to approve the transaction, the transaction request can then transferred through the network to the identity management system 100. If the transferred transaction matches the pre-approved transaction (including any limitations and filtrations such as time, geography, and the like), the transaction can be approved and the results can be sent back to the merchant.

Figure 14:
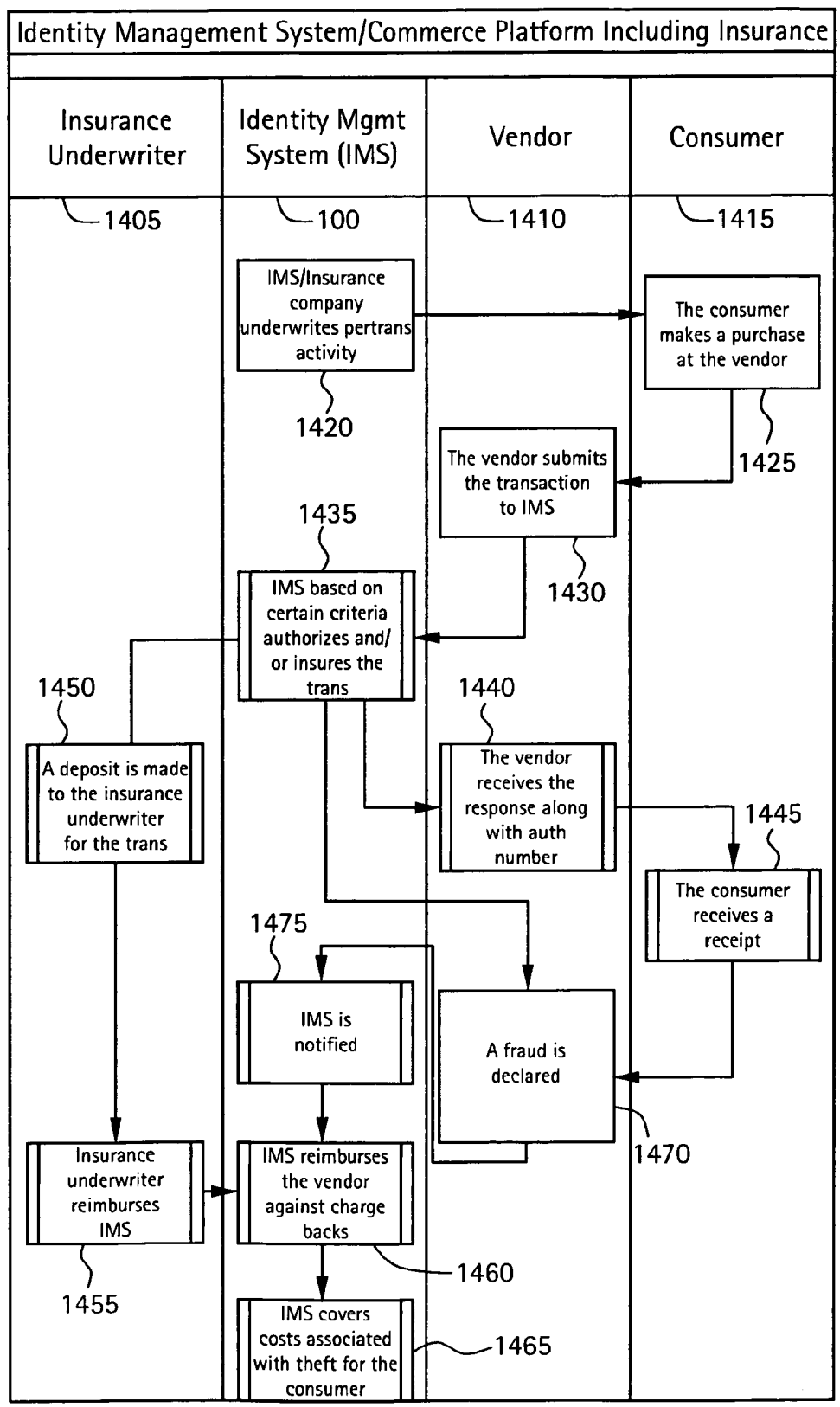
FIG. 14 is a diagram illustrating insurance coverage using the identity management system, in accordance with an exemplary embodiment of the present invention.

The identity management system 100 can be used as a commerce or e-commerce platform that can provide users and/or merchants per transaction insurance coverage. FIG. 14 is a diagram illustrating insurance coverage using the identity management system 100, in accordance with an exemplary embodiment of the present invention. The per transaction insurance coverage can include a suitable insurance underwriter 1405, the identity management system 100, a vendor 1410 and a consumer 1415. In step 1420, the identity management system 100 in conjunction with the insurance underwriter 1405 can underwrite the per transaction activity. A per transaction insurance coverage can be calculated in many different ways. For example, the coverage and rates can be based on the number of transactions the consumer 1415 makes, the number of transactions a vendor 1410 receives, the dollar amount of the transaction, the fraud risk associated with the purchased item, the fraud risk associated with the consumer 1415 habits, and other like information. The purpose of the insurance can be for, for example, identity theft fraud, credit card fraud, damaged merchandise, or the like. For example, the identity management system 100 can be underwritten by an insurance company to provide per transaction insurance to consumers 1415 and/or vendors 1410. If the consumer 1415 uses the identity card 145 for identity verification and/or for another transaction at or with the vendor 1410, the given transaction can be insured by the identity management system 100. For being insured, a suitable fee can be charged to every transaction. Such a fee can be paid by the vendor 1410 and/or the consumer 1415. Alternatively, neither party pays such a fee and the cost can be offset by other income, charges, fees, or the like.

For example, in step 1425, the consumer 1415 can purchase an item (e.g., on-line or POS) from the vendor 1425. In step 1430, the vendor 1410 can submit the transaction to the identity management system 100. In step 1435, the identity management system 100 can authorize and/or insure the transaction, based suitable criteria. In step 1440, the vendor 1410 can receive the response to the transaction submission, along with, for example, an authorization number. In step 1445, the consumer 1415 can be provided with a receipt (e.g., a paper receipt or electronic notification). In step 1450, if the transaction was insured, a deposit can be made to the insurance underwriter 1405 for the transaction. In step 1455, the insurance underwriter can reimburse the identity management system 100 for the cost of the insurance coverage. In step 1460, the identity management system 100 can reimburse the vendor 1410 against back charges, such as, for example, for the insurance coverage if paid by the vendor 1410.

At any of steps 1435, 1440 or 1445, a fraud can be declared in step 1470. For example, either the consumer 1415, the vendor 1410 or the identity management system 100 can determine that a fraud has occurred (e.g., an unauthorized charge made on a credit card) in any suitable manner. If a fraud has occurred, then the identity management system 100 can be appropriately notified in step 1475. The identity management system 100 can reimburse the vendor against any, all or none of the back charges in step 1460. In step 1465, the identity management system 100 can suitably cover any, all or none of the costs associated with the theft or fraud associated with the consumer 1415.

Figure 15:
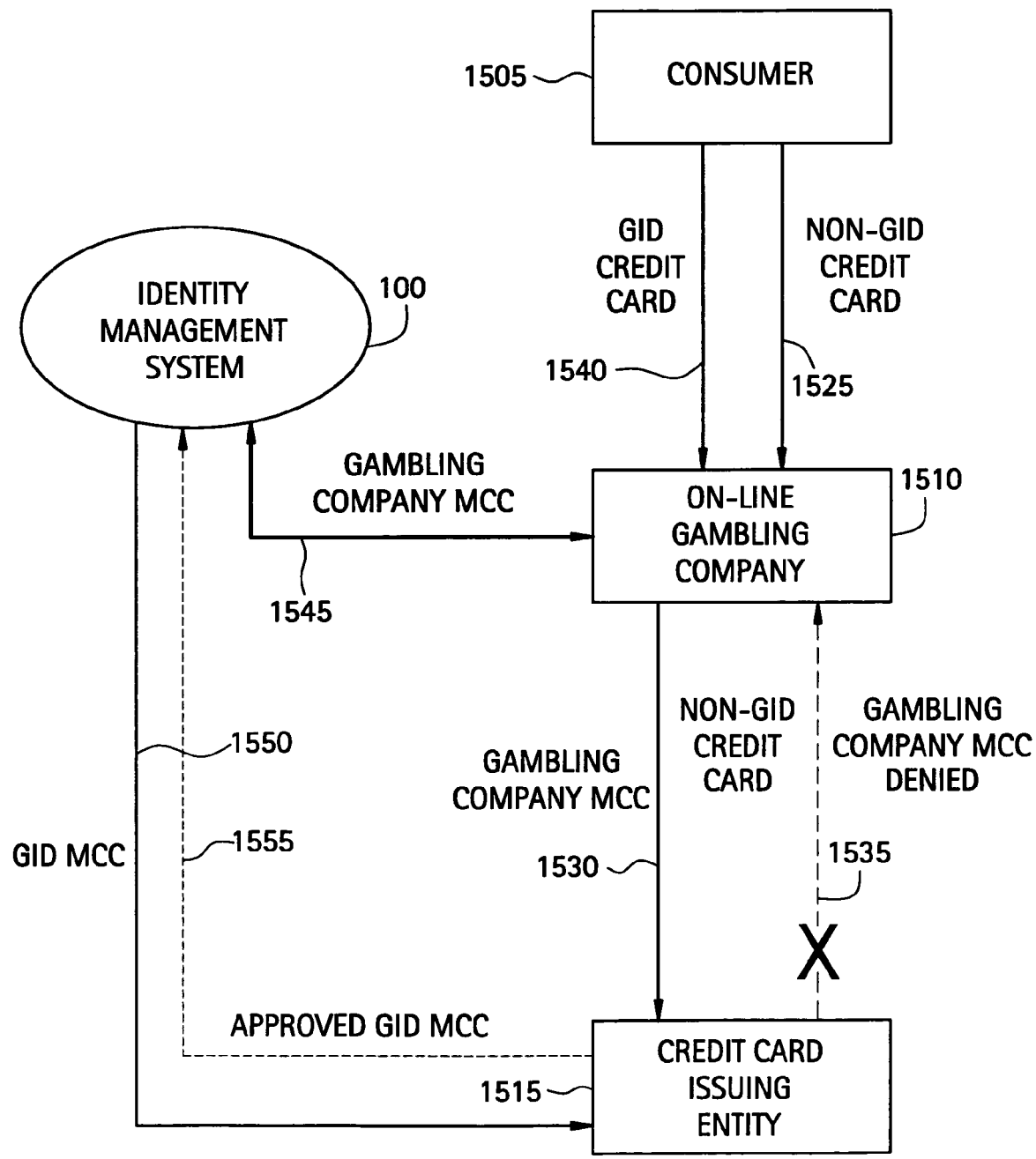
FIG. 15 is a diagram illustrating on-line gambling transactions with the identity management system, in accordance with an exemplary embodiment of the present invention.

Certain business sectors can benefit greatly from the identity management system 100, especially from the commerce and the e-commerce platforms according to exemplary and alternative exemplary embodiments thereof. For example, on-line gambling and on-line adult entertainment sites are presently being sanctioned by many credit card issuing entities because of, for example, general negative public opinion regarding these industries and increased risk of fraud. For these reasons and others, many credit card issuing companies can block the Merchant Category Codes (MCCs) of these businesses. FIG. 15 is a diagram illustrating on-line gambling transactions with the identity management system 100, in accordance with an exemplary embodiment of the present invention. As illustrated in FIG. 15, if a consumer 1505 attempts to use a non-GID credit card (e.g., a credit card not associated with the identity management system 100) for an on-line gambling company 1510 (see flow 1525), the MCC of the on-line gambling company 1510 would be passed to the credit card issuing entity 1515 (see flow 1530). However, the credit card issuing company 1515 can deny the transaction, because the MCC of the on-line gambling company 1510 is blocked (see flow 1535).

However, according to exemplary embodiments, when a transaction passes through the identity management system 100, the MCC of the identity management system 100 can be used instead of that of the vendors. Therefore, consumers 1505 can use their credit cards without unwanted restrictions. For example, assume that the consumer 1505 visits an on-line merchant (e.g., on-line gambling company 1510) whose MCC is blocked by the consumer 1505 credit card issuing entity 1515. If the consumer 1505 uses their Global Identity Credit Card (e.g., identity card 145) (see flow 1540) to, for example, subscribe to an on-line gambling site, the MCC that will be presented to the credit card issuing entity 1515 will be the MCC of the identity management system 100. For example, the on-line gambling company 1510 can communicate the transaction information with the identity management system 100 (see flow 1545). The identity management system 100 can then pass the transaction information and the MCC of the identity management system 100 to the credit card issuing entity 1515 (see flow 1550). Approval for the transaction can then be passed back from the credit card issuing entity 1515 to the identity management system 100 (see flow 1555), and from the identity management system 100 to the on-line gambling company 1510 (see flow 1545) to complete the transaction. Because the MCC of the identity management system 100 would not be blocked, the transaction can occur and be processed. Additionally and as described above, by using the identity management system 100, the user can enjoy a high level of security. Because users can manage, control and set restrictions on their stored accounts, the users can substantially reduce the incidence of credit card and/or identity fraud.

Figure 12A:
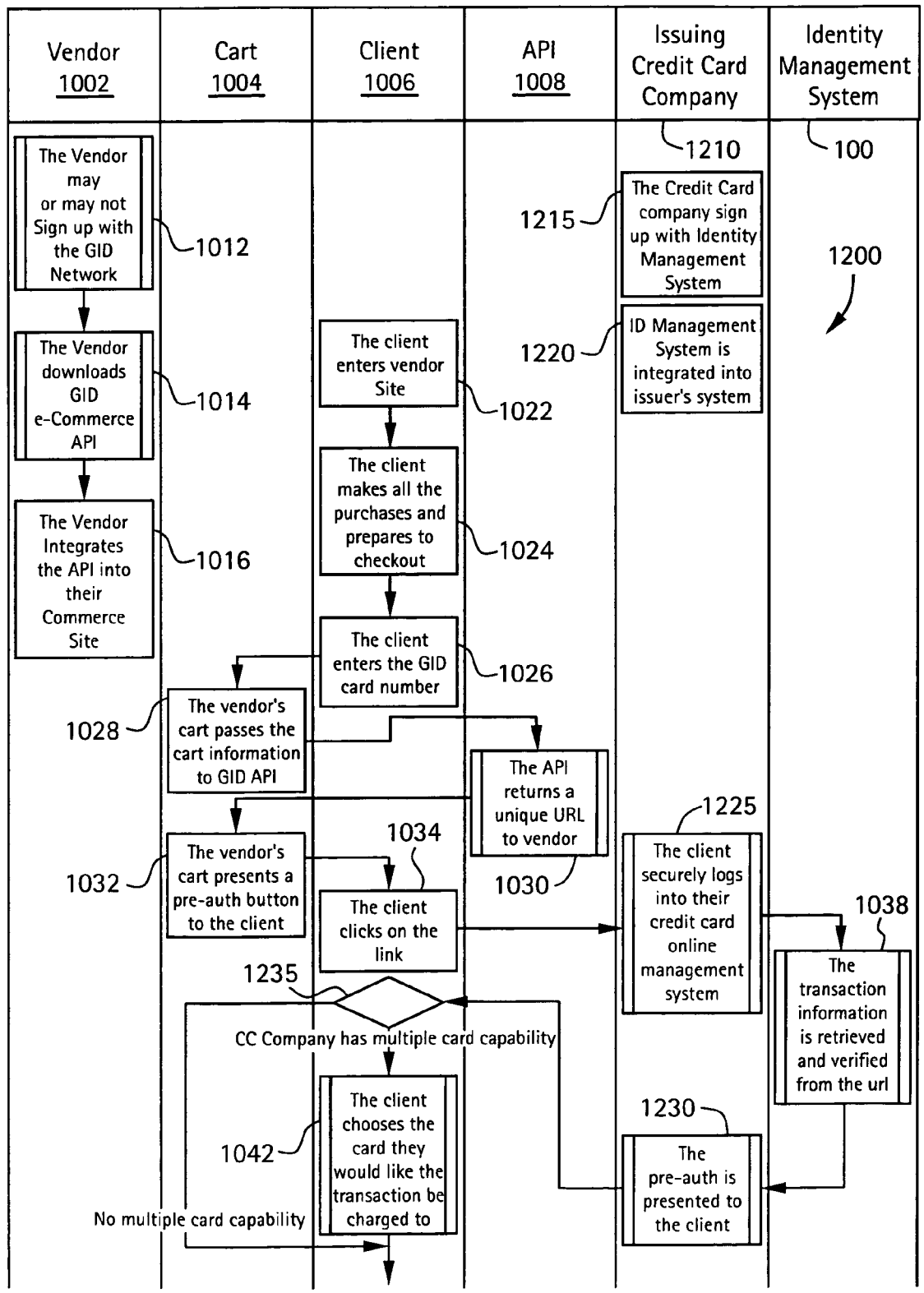
FIGS. 12A and 12B are flow diagrams illustrating a transaction using an automated pre-authorization process for the identity management system without registration and without using a one-time card number, in accordance with an exemplary embodiment of the present invention.
Figure 12B:
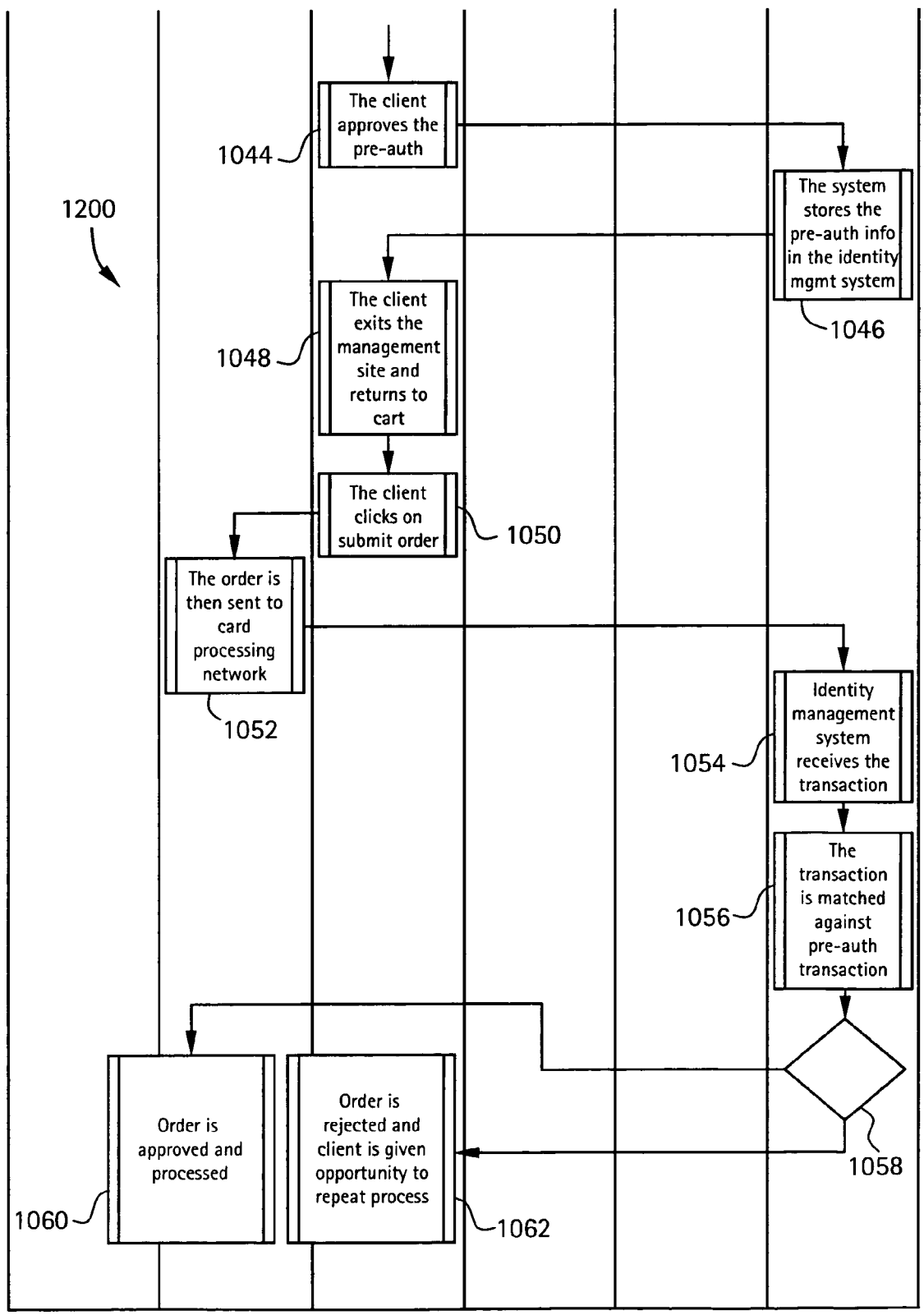

A further example of Automated Pre-Authorization can occur when there are no system registration requirements and each financial entity can provide the Automated Pre-Authorization to their clients. FIGS. 12A and 12B are flow diagrams illustrating a transaction 1200 using an automated pre-authorization process for the identity management system 100 without registration and without using a one-time card number, in accordance with an exemplary embodiment of the present invention. In such a scenario, vendors 1002 can download and integrate the appropriate e-commerce APIs into their commerce websites, as discussed with respect steps 1012-1016 of FIGS. 10A and 11A. In addition, in step 1215, a credit card issuing entity 1210 can become a member of the identity management system 100. In step 1220, the credit card issuing entity 1210 can integrate the identity management system 100 into their systems.

For purposes of illustration and not limitation, assume that the client 1006 of the member credit card issuing entity 1210 shops on-line. The transaction can continue in the manner discussed in steps 1022-1034 with respect to FIGS. 10A and 11A. In other words, at the check-out page, client 1006 can enter their GID card number (this time issued by the credit card issuing entity 1210) to use the transaction Pre-Authorization. The vendor 1002 can recognize the GID card number and can send the information to the GID API. The GID API can send the vendor a unique URL to present the Pre-Authorization link to the client 1006 (the link can be either pre-stored in the API or the API can be configured to request the link from a secure connection to the identity management system 100). Once the client 1006 clicks on the Pre-Authorization link, in a new or separate window, the client 1006 can follow a secure login protocol to reach the identity management system 100 (through the credit card online management system of the credit card issuing entity 1210). In other words, in step 1225, the client 1006 can securely log into the credit card online management system of the credit card issuing entity 1210. The transaction information can be retrieved and verified from the presented link, as discussed with respect to step 1038 illustrated in FIGS. 10B and 11A. In step 1230, the pre-authorization can be presented to the client from the credit card online management system of the credit card issuing entity 1210. In decision step 1235, a determination can be made as to whether the credit card issuing entity 1210 has the capability to handle multiple credit cards for each client 1006. If so, then in step 1042, the client 1006 can choose the card to which they would like the transaction charged.

In FIG. 12B, the flow continues to step 1044 if either the credit card issuing entity has no multi-card capability or if step 1042 is successfully completed. The process can then continue in steps 1046-1062 in the manner discussed previously with respect to FIGS. 10B and 11B. Thus, the submitted order can be cross referenced with the information stored at the identity management system 100 to verify the pre-authorization. The order or transaction can then be verified or rejected based on whether there is a match with the pre-authorization information stored at the identity management system 100.

Figure 13A:
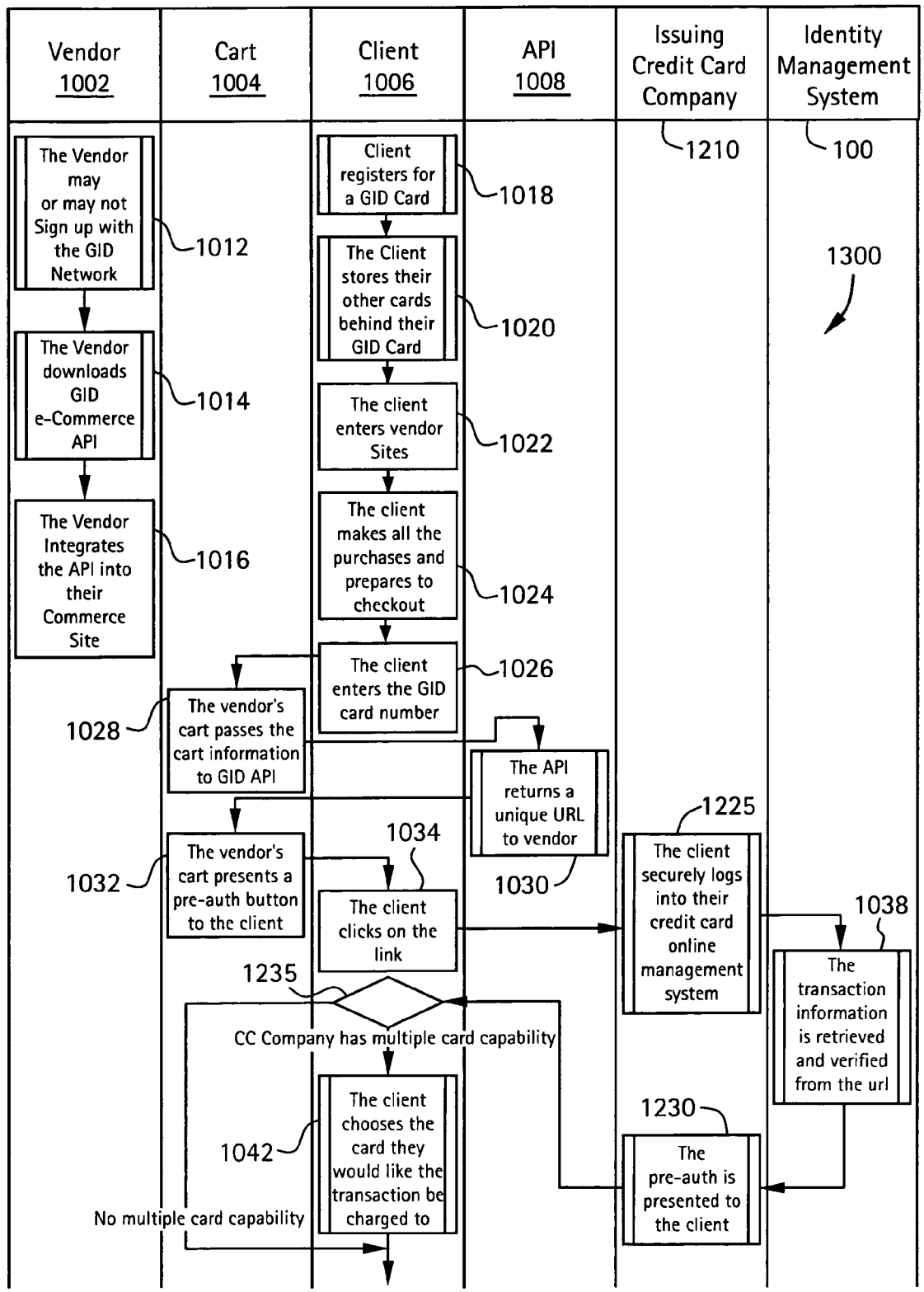
FIGS. 13A and 13B are flow diagrams illustrating a transaction using an automated pre-authorization process for the identity management system without registration but using a one-time card number, in accordance with an exemplary embodiment of the present invention.
Figure 13B:
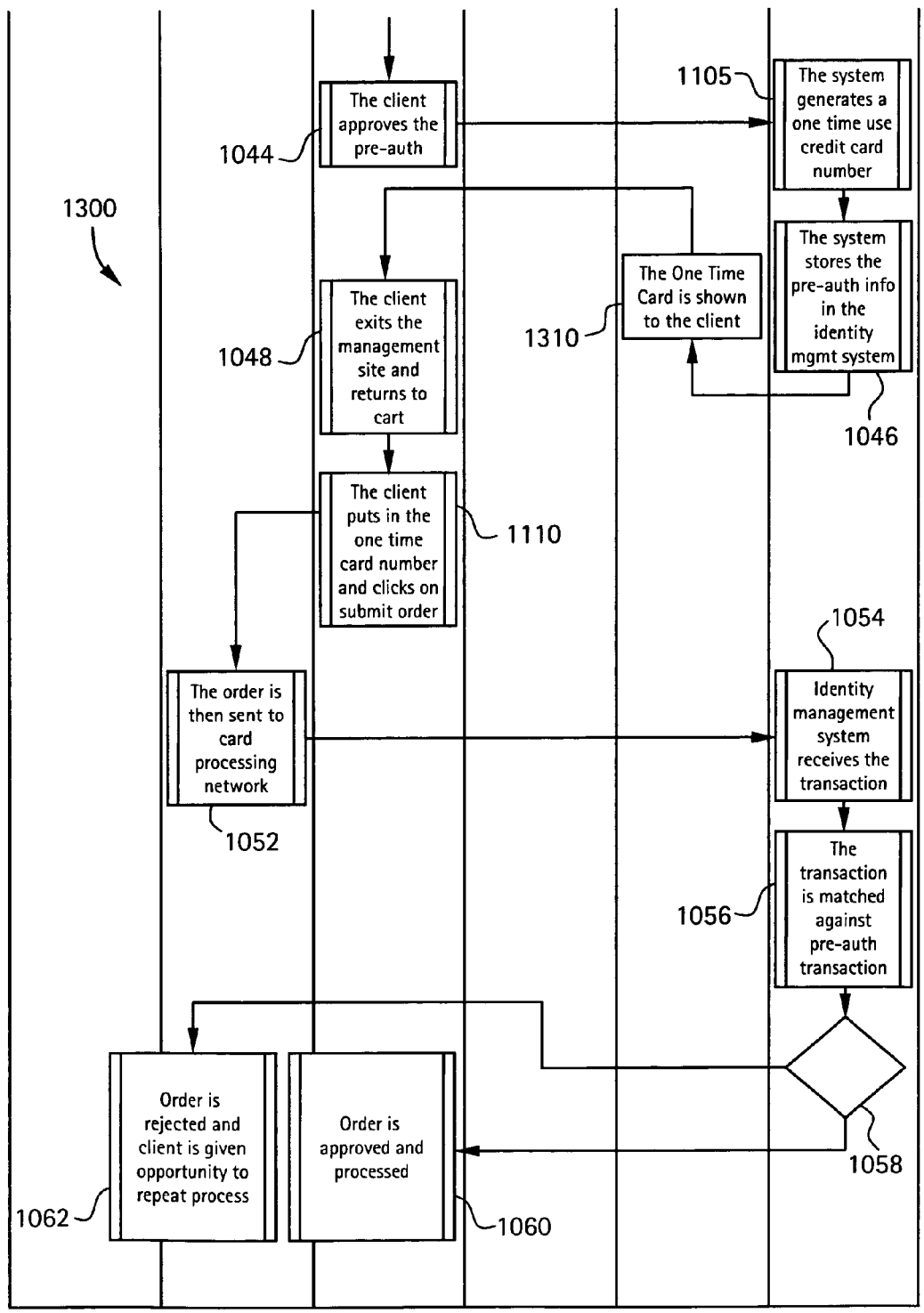

FIGS. 13A and 13B are flow diagrams illustrating a transaction 1300 using an automated pre-authorization process for the identity management system 100 without registration but using a one-time card number, in accordance with an exemplary embodiment of the present invention. The transaction 1300 proceeds with steps 1012-1034 in the manner discussed previously with respect to FIGS. 10A, 11A and 12A. However, steps 1215 and 1220 are not executed for transaction 1300, as no registration takes place by the credit card issuing entity 1210. The flow of transaction 1300 then proceeds through step 1225, 1038, 1230, 1235 and 1042, in the manner discussed with respect to FIG. 12A. In FIG. 13B, the flow of transaction 1300 continues through steps 1044, 1105 and 1046, in the manner discussed with respect to FIG. 11B. However, in step 1310, the one-time use credit card is shown or otherwise presented to the client 1006 through, for example, the credit card online management system of the credit card issuing entity 1210. In other words, after the client 1006 chooses a credit card to be applied to the transaction, the credit card issuing entity 1210 of the client 1006 can provide the client 1006 with a one-time use temporary credit card number that the client 1006 can use to apply to the transaction. The client can take the temporary credit card number and enter it in the appropriate space on the vendor 1006 check-out page (or it can be entered automatically by the system) and click on the submit link to finalize the transaction. The flow of transaction 1300 can then proceed through steps 1048, 1110 and 1052-1062, as discussed with respect to FIG. 11B, so that the order or transaction can then be verified or rejected based on whether there is a match with the pre-authorization information stored at the identity management system 100.

According to an alternative exemplary embodiment, although purchase transactions submitted to the identity management system 100 can be automatically processed by the system based on one or more predetermined rules, purchase transactions can be submitted to the identity management system 100 for queuing and manual processing. For purposes of illustration and not limitation, assume a user purchases audio compact discs (CDs) through a catalog, where the company selling the CDs requires that the user buy an additional five CDs every month for six months. According to the alternative exemplary embodiment, the user can put a manual hold on this purchase transaction and review the transaction manually through the identity management system 100 before allowing the merchant to charge the credit card or other form of payment. Thus, the user can be assured that the correct amount for the transaction is being deducted at the correct time. However, such a process can also be automated through an appropriate rule set, such as, for example, where any transactions conducted by this merchant can be restricted to a certain amount per month per charge for a maximum of six months.

The identity management system 100 of the present invention can also be used to combat mail fraud to which the user may fail prey. Referring to FIG. 1, according to exemplary embodiments, the identity management system 100 can include an address identification code generation module 155 in communication with, for example, the total identification score generation module 115. The address identification code generation module 155 is configured to generate an address identification code associated with an address of the user. For example, a user of the identity management system 100 can establish an address (e.g., the user's home address) and the identity management system 100 will generate a unique address identification code associated with that address. The address identification code can be any suitable number (e.g., a random number, code or the like) that uniquely identifies a user and the user's associated address. For example, if the user's home address is 123 Street, Smith City, Va. 12345, the address identification code generation module 155 can generate a unique address identification code such as, for example, 187653 that represents the user's address. The address identification code and an address of a communication reception center (e.g., a generic mail processing center) can be given to a third party. For example, the address information could be 123 Processing Street, Box 187653, New City, Utah 54321, in which the address identification code forms the box number of the address of the communication reception center. Any communications sent to the user at that address by the third party are received at the communications reception center.

Once the communications or other mail are received by the communication reception center, the communications can be scanned or otherwise entered into the identity management system 100 and made available to the user associated with the address identification code. For example, the identity management system 100 can include a communication display module 160 in communication with, for example, the total identification score generation module 115. The communication display module 160 is configured to format the communications for display to the user associated with the address identification code (e.g., through the graphical user interface 170). Thus, the user can be notified of incoming mail (e.g., through electronic notification, such as e-mail) and access its mail, for example, remotely over the Internet by logging into the identity management system 100 and retrieve any and all communications received at the communication reception center.

Furthermore, instead of sending confidential material to the user through the mail (e.g., credit card statements, bank statements and other the like confidential material), the respective financial or other like institutions can access the identity management system 100 and enter such information into the system. Consequently, the user can access its financial statements and other confidential information directly from the identity management system 100, without the need to generate postal mail. In this manner, confidential communications can be sent to the user in a secure manner, without fear that such mail could be stolen from, for example, the user's mailbox. Such an advantage is particularly important where an identity thief could steal a credit card statement from a user's mailbox and use the information contained within the credit card statement to create another credit card for illegal use by the identity thief.

Identity theft threatens every societal and economical sector. Healthcare is not immune from this threat. According to an exemplary embodiment of the present invention, the identity management system 100 can also be used to prevent healthcare identity theft. For example, a patient can go to the healthcare provider. To register the patient for the first time, the administrator can enter the patient's drivers license or other unique identifying documentation into the identity management system 100, as well as any other required patient's personal information, billing information, scheduling and the like. For healthcare providers, access to identity management system 100 can be granted to authorized administrators. Each authorized administrator can have a unique PIN for accessing identity information in the identity management system 100. However, all accesses can be recorded and logged for security purposes. The identity management system 100 can be integrated with other suitable systems to retrieve, for example, other healthcare-related information and the like.

If the patient does not have a drivers license or other identifying documentation, a unique identifying number can be assigned to the patient that is maintained by the identity management system 100. The identifying number can be associated with an appropriate barcode. The identifying number and barcode can be placed on a card for the patient to maintain. During future visits, the patient can present the card to sign-in with the healthcare provider. The patient's identification information and healthcare information can be maintained securely in the identity management system 100. Consequently, secure identity information will not have to be included in the patient's physical or electronic files. The patient's physical file can be assigned a barcode that correlates to the patient's unique identifying number to allow for easy retrieval from the healthcare provider's file room. The healthcare provider can then store patient files without concerns for information theft. Such a system can also place the healthcare providers in compliance with HIPAA regulations, because the patient's secure identity information has been removed from the files, thereby preserving patient identity privacy.

The identity management system 100 can include an identity risk factor generation module 165 in communication with, for example, the total identification score generation module 115. The identity risk factor generation module 165 is configured to generate an identity risk factor associated with the user. According to exemplary embodiments, the identity risk factor is associated with a level of risk of theft of the identity of the user by identity thieves. For example, the identity risk factor generation module 165 is configured to determine the exposure of a user's identity by analyzing such factors as, for example, the number and types of uses of the user's identity. For example, if a user uses its identity to perform numerous online purchases with companies located in certain third world countries, the identity risk factor generation module 165 can determine that the level of risk of theft of the user's identity is high, and can generate a correspondingly high identity risk factor. However, if a user uses its identity only sporadically to apply for credit with reputable financial institutions, the identity risk factor generation module 165 can determine that the level of risk of theft of the user's identity is low, and generate a correspondingly low identity risk factor. Thus, by analyzing the pattern and types of uses of a user's identity (e.g., as maintained by the log module 135), the identity risk factor generation module 165 can generate an appropriate identity risk factor. The user can then use the identity risk factor to reduce its exposure to potential identity theft by, for example, modifying the manner and types of uses of the user's identity.

The identity management system 100 can also include any suitable type of graphical user interface 170 configured to provide access to, either locally or remotely, and management of identification information associated with the user. Thus, the graphical user interface 170 can be, for example, any suitable Web browser that can support secure connections and remote access to the identity management system 100. The graphical user interface 170 can be displayed on any suitable computer display or monitor capable of displaying graphical and/or textual information to a user and which allows a user to enter information (e.g., commands, information and the like) through, for example, a keyboard, a touch-screen, any type of pointing device, electronic pen, and the like. The graphical user interface 170 can be used by the user to access, control and manage any and all of the functionality of the identity management system 100, including viewing and managing the user's identity profile, viewing identity reports, and the like.

Each of modules of identity management system 100, including identification score assignment module 105, total identification score generation module 115, access code generation module 125, data transmission module 130, log module 135, report generation module 140, transaction order generation module 150, address identification code generation module 155, communication display module 160 and identity risk factor generation module 165, or any combination thereof, can be comprised of any suitable type of electrical or electronic component or device that is capable of performing the functions associated with the respective element. According to such an exemplary embodiment, each component or device can be in communication with another component or device using any appropriate type of electrical connection that is capable of carrying electrical information. Alternatively, each of the modules of identity management system 100 can be comprised of any combination of hardware, firmware and software that is capable of performing the function associated with the respective module. In addition, communication link 133 can be comprised of any suitable type of communication medium or channel capable of transmitting and receiving electrical information.

Alternatively, the identity management system 100 can be comprised of a microprocessor and associated memory that stores the steps of a computer program to perform the functions of the modules of the identity management system 100. The microprocessor can be any suitable type of processor, such as, for example, any type of general purpose microprocessor or microcontroller, a digital signal processing (DSP) processor, an application-specific integrated circuit (ASIC), a programmable read-only memory (PROM), an erasable programmable read-only memory (EPROM), an electrically-erasable programmable read-only memory (EEPROM), a computer-readable medium, or the like. The memory can be any suitable type of computer memory or any other type of electronic storage medium, such as, for example, read-only memory (ROM), random access memory (RAM), cache memory, compact disc read-only memory (CDROM), electro-optical memory, magneto-optical memory, or the like. As will be appreciated based on the foregoing description, the memory can be programmed using conventional techniques known to those having ordinary skill in the art of computer programming. For example, the actual source code or object code of the computer program can be stored in the memory.

FIGS. 2A-2C are flowcharts illustrating steps for verifying an identity of a user, in accordance with an exemplary embodiment of the present invention. In step 201 of FIG. 2A, at least one source of identification of the user is received. According to exemplary embodiments, the at least one source of identification can comprise a driver's license of the user, a birth certificate of the user or the like. The identification score assigned to each of the at least one source of identification is based upon a reliability of the at least one source of identification. In step 204, an identification score is assigned to each of the at least one source of identification. In step 207, a total identification score of the user is generated from the identification scores of each of the at least one source of identification and a predetermined function. The predetermined function can comprise a summing function, a weighted summing function or the like. The total identification score of the user is associated with a level of verification of the identity of the user. The total identification score of the user is compared to a minimum identification score associated with a transaction. The transaction can comprise an application for credit, a purchase transaction or the like. The transaction is performed when the total identification score of the user is one of greater than and equal to the minimum identification score. Additional sources of identification of the user are received before performing the transaction when the total identification score is less than the minimum identification score.

In step 210, at least one of personal information and financial information of the user can be supplied to a third party. The total identification score can be associated with the at least one of personal information and financial information of the user. In step 213, a unique identity access authorization code associated with the user can be generated for use by a third party in the transaction. In step 216, at least the total identification score of the user can be transmitted to the third party upon verification of the identity access authorization code. At least the total identification score of the user can be transmitted to the third party upon further verification of a user identification code of the user. The user identification code can comprise a social security number of the user or the like. In step 219, accesses associated with the total identification score of the user by the third party can be recorded. In step 222, the record of accesses associated with the total identification score of the user can be reviewed. In step 225, at least one of personal information and financial information associated with the user can be transmitted to the third party upon verification of the identity access authorization code of the user. The at least one of personal information and financial information associated with the user can be transmitted to the third party upon further verification of a user identification code of the user. The user identification code can comprise a social security number of the user or the like.

In step 228 of FIG. 2B, an identity card securely containing identification information associated with the user can be issued. The identity card can comprise a smart card or the like. The identification information associated with the user can be encrypted on the identity card. In step 231, uses of the identification information securely contained on the identity card can be restricted. The uses of the identification information can be restricted in many ways. For example, FIG. 3 is a flowchart illustrating steps for restricting uses of identification information securely contained on an identity card, in accordance with an exemplary embodiment of the present invention. In step 305 of FIG. 3, locations of where the identification information is used can be restricted. In step 310, times of when the identification information is used can be restricted. In step 315, types of transactions for which the identification information is used can be restricted.

Returning to FIG. 2B, in step 234, a determination can be made as to whether use of the identification information is restricted by the user for the transaction. If so, then in step 237, use of the identification information can be prohibited for the transaction. If not, then in step 240, the identification information can be used for the transaction. In either case, in step 243, a transaction order can be generated using the total identification score of the user. In step 246, the transaction order can be submitted to perform the transaction. In step 249, at least one of personal information and financial information of the user can be transmitted, upon verification of the transaction order, to complete the transaction.

In FIG. 2C, in step 252, an address identification code can be associated with an address of the user. In step 255, the address identification code and an address of a communication reception center can be supplied to a third party. In step 258, communications for the user can be received from the third party at the communication reception center. The communications can include the address identification code, for example, as part of the address on the communications. In step 261, the communications can be supplied to the user associated with the address identification code. In step 264, an identity risk factor associated with the user can be supplied. The identity risk factor is associated with a level of risk of theft of the identity of the user by identity thieves.

FIG. 4 is a flowchart illustrating steps for verifying an identity of a user, in accordance with an alternative exemplary embodiment of the present invention. In step 405, at least one source of identification of the user is received. In step 410, an identification score is assigned to each of the at least one source of identification. In step 415, a total identification score of the user is generated from the identification scores of each of the at least one source of identification and a predetermined function. The total identification score of the user is associated with a level of verification of the identity of the user. In step 420, the total identification score of the user is compared to a minimum identification score associated with a transaction. In step 425, the transaction is approved when the total identification score of the user is one of greater than and equal to the minimum identification score. In step 430, additional sources of identification of the user are requested before approving the transaction when the total identification score is less than the minimum identification score.

FIG. 5 is a flowchart illustrating steps for verifying an identity of a user, in accordance with an alternative exemplary embodiment of the present invention. In step 505, at least one source of identification of the user is received. In step 510, an identification score is assigned to each of the at least one source of identification. In step 515, a total identification score of the user is generated from the identification scores of each of the at least one source of identification and a predetermined function. The total identification score of the user is associated with a level of verification of the identity of the user. In step 520, approval of the transaction is received when the total identification score of the user is one of greater than and equal to a minimum identification score. In step 525, a request for additional sources of identification of the user is received before receiving approval of the transaction when the total identification score is less than the minimum identification score.

FIG. 6 is a flowchart illustrating steps for verifying an identity of a user, in accordance with an alternative exemplary embodiment of the present invention. In step 605, a total identification score of the user is received. The total identification score is generated from identification scores assigned to each of at least one source of identification of the user and a predetermined function. The total identification score of the user is associated with a level of verification of the identity of the user. In step 610, the total identification score of the user is compared to a minimum identification score associated with a transaction. In step 615, the transaction is approved when the total identification score of the user is one of greater than and equal to the minimum identification score. In step 620, additional sources of identification of the user are requested before approving the transaction when the total identification score is less than the minimum identification score.

Any or all of the steps of a computer program as illustrated in FIGS. 2A, 2B, 2C and 3-6 for identity verification and management can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Exemplary embodiments of the present invention can be used in conjunction with any device, system, process or transaction in which the reliability and authenticity of the identification information associated with a user is needed. For example, exemplary embodiments can be used by financial institutions as part of various types of financial transactions (e.g., applications for credit), by retail establishments as part of various types of purchase transactions (e.g., online or in-person merchandise purchases using credit cards), by credit reporting agencies to maintain, manage and verify the identity of users in conjunction with the maintenance of the credit history of a user, and the like.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and applications, foreign patents, and publications discussed above are hereby incorporated herein by reference in their entireties.

What is claimed is:

1. A processor-based system for verifying an identity of a user in a transaction, comprising:

a data storage device, wherein at least one of personal information and financial information of the user is stored in the data storage device, wherein the total identification score is associated with the at least one of personal information and financial information of the user;

a processor, the processor being operatively coupled to the data storage device and a plurality of modules, each module being configured to carry out at least one operation;

an identification score assignment module operatively coupled to the processor, wherein the identification score assignment module is configured to receive at least one source of identification of the user, and wherein the identification score assignment module is configured to assign an identification score to each of the at least one source of identification;

a total identification score generation module operatively coupled with the identification score assignment module, wherein the total identification score generation module is configured to generate a total identification score of the user from the identification scores of each of the at least one source of identification and a predetermined function, wherein the total identification score of the user is associated with a level of verification of the identity of the user, wherein the total identification score of the user is compared to a minimum identification score associated with a transaction, wherein the transaction is performed when the total identification score of the user is greater than or equal to the minimum identification score, and wherein additional sources of identification of the user are received before performing the transaction when the total identification score is less than the minimum identification score;

a log module operatively coupled to the processor, wherein the log module records accesses associated with the total identification score of the user by the third party;

an access code generation module operatively coupled to the processor, wherein the access code generation module is configured to generate a unique identity access authorization code associated with the user for use by a third party to access information associated with the user; and a data transmission module operatively coupled to the processor, wherein the data transmission module is configured to transmit at least the total identification score of the user to a third party.

2. The processor-based system of claim 1, wherein the data transmission module is configured to transmit at least the total identification score of the user to the third party upon further verification of a user identification code of the user.

3. The processor-based system of claim 1, comprising:
a report generation module operatively coupled to the processor, wherein the report generation module is configured to generate reports for displaying the record of accesses associated with the total identification score of the user.

4. The processor-based system of claim 1, comprising:
an identity card, wherein the identity card is configured to securely contain identification information associated with the user.

5. The processor-based system of claim 1, comprising:
a transaction order generation module operatively coupled to the processor, wherein the transaction order generation module is configured to generate a transaction order using the total identification score of the user, wherein the transaction order is submitted by the user to perform the transaction, and wherein at least one of personal information and financial information of the user is accessed, using the transaction order, to complete the transaction.

6. The processor-based system of claim 1, comprising:
an address identification code generation module operatively coupled to the processor, wherein the address identification code generation module is configured to generate an address identification code associated with an address of the user, wherein the address identification code and an address of a communication reception center is supplied to a third party, wherein communications for the user from the third party are received at the communication reception center, and wherein the communications include the address identification code; and a communication display module operatively coupled to the processor, wherein the communication display module is configured to display the communications to the user associated with the address identification code.

7. The processor-based system of claim 1, comprising:
an identity risk factor generation module operatively coupled to the processor, wherein the identity risk factor generation module is configured to generate an identity risk factor associated with the user, and wherein the identity risk factor is associated with a level of risk of theft of the identity of the user by identity thieves.

8. The processor-based system of claim 1, wherein the transaction comprises an application for credit.

9. The processor-based system of claim 1, wherein the transaction comprises a purchase transaction.

10. The processor-based system of claim 1, comprising:
a graphical user interface operatively coupled to the processor, wherein the graphical user interface is configured to provide access to and management of identification information associated with the user.

* * * * *